United States Patent [19]

Eickmann

[11] Patent Number: 4,899,957

[45] Date of Patent: Feb. 13, 1990

[54] AIR BORNE CRAFT, FOR EXAMPLE HELICOPTER, AND RELATED DEVICES

[76] Inventor: Karl Eickmann, 2420 Isshiki, Hayama-machi, Kanagawa-ken, Japan

[21] Appl. No.: 105,848

[22] Filed: Oct. 7, 1987

Related U.S. Application Data

[60] Continuation-in-part of Ser. No. 943,220, Dec. 17, 1986, abandoned, Ser. No. 621,638, Jun. 18, 1984, Pat. No. 4,703,906, Ser. No. 610,871, Sep. 8, 1975, Pat. No. 3,790,105, and Ser. No. 610,872, Sep. 8, 1975, abandoned, said Ser. No. 943,220, is a continuation-in-part of Ser. No. 619,958, Jun. 12, 1984, Pat. No. 4,630,528, which is a division of Ser. No. 243,324, Mar. 13, 1981, Pat. No. 4,456,430, which is a continuation-in-part of Ser. No. 110,157, Jan. 7, 1980, and Ser. No. 954,555, Oct. 25, 1978, Pat. No. 4,358,073, which is a continuation-in-part of Ser. No. 800,756, May 26, 1977, abandoned, which is a continuation-in-part of Ser. No. 465,413, Apr. 30, 1974, abandoned, said Ser. No. 110,157, is a continuation-in-part of Ser. No. 895,687, Apr. 12, 1978, abandoned, which is a continuation-in-part of Ser. No. 760,006, Jan. 17, 1977, Pat. No. 4,136,845, which is a continuation-in-part of Ser. No. 104,676, Mar. 8, 1971, Pat. No. 3,823,898, said Ser. No. 621,638, is a continuation-in-part of Ser. No. 243,324, , said Ser. No. 610,871, and Ser. No. 610,872, each is a division of Ser. No. 416,237, Nov. 15, 1973, abandoned, which is a division of Ser. No. 131,782, Apr. 6, 1971, Pat. No. 3,790,105.

[51] Int. Cl.$^4$ .............................................. B64C 27/04
[52] U.S. Cl. ..................................... 244/17.11; 244/6; 244/17.19
[58] Field of Search ................ 244/6, 7, 17.11, 17.19, 244/7.21

[56] References Cited

U.S. PATENT DOCUMENTS

| | | | |
|---|---|---|---|
| 2,580,312 | 12/1951 | Moore | 244/7 C |
| 2,749,059 | 6/1986 | Meyers et al. | 244/7 R |
| 3,034,822 | 5/1962 | Bolliger | 244/7 R |
| 3,375,996 | 4/1968 | Wilde | 244/7 R |
| 3,403,734 | 10/1968 | Herrmann | 244/7 R |
| 3,563,493 | 2/1971 | Zuck | 244/7 A |
| 4,589,611 | 5/1986 | Ramme et al. | 244/6 |
| 4,730,795 | 3/1988 | David | 244/6 |

*Primary Examiner*—Galen Barefoot

[57] ABSTRACT

In a vehicle or device a fluid motor is employed to drive rotary members, such as wheels, propellers, tracks. The motor is provided with an arrangement which includes a control means and an axially moveable member. By utilizing the control means, for example, by a flow of fluid, the axially moveable member is used to apply an action, which is not common to the usual operation of fluid motors. The arrangement may be used to arrest the rotor of the motor from rotation when no pressure is in the driving fluid line. It may also be used to control the pitch of propellers with variable pitch arrangements. Also possible is to use the arrangement to automatically obtain an auto-rotation of rotor blades on vertical axes of vertically take off and landing vehicles, when the pressure in the fluid line to the motors for driving the motors drops below a predetermined minimum of pressure.

The speciality of the preferred embodiment which is shown in FIGS. 18, 19, 24 to 26 and 34 to 37 consists in the provision of a tail propeller, a main lift propeller and a rate of power varying means in the transmission between the power plant and the mentioned propellers. Thereby the tail propeller acts as forward driving propeller, while the main lift propeller may act with vertical or slightly inclined axis or it may be stopped to rest. The vehicle can thereby fly as a helicpoter or selectively as a gyrocopter and as an aircraft flying on wings if the wing assembly is assembled to the vehicle.

1 Claim, 13 Drawing Sheets

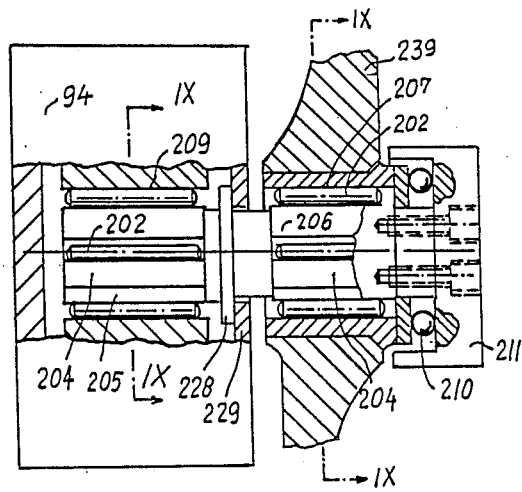
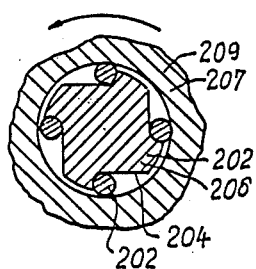
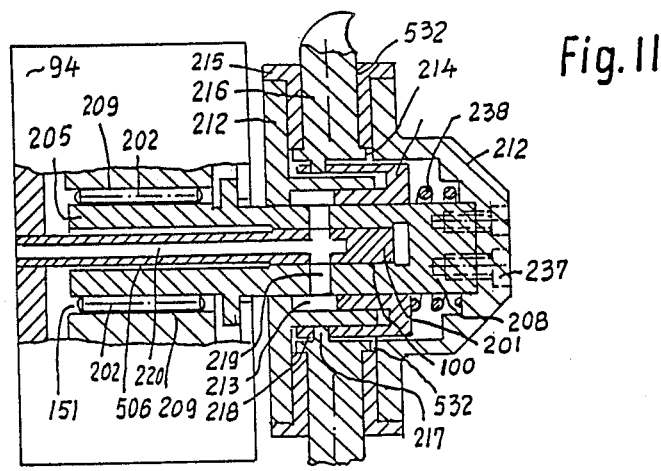
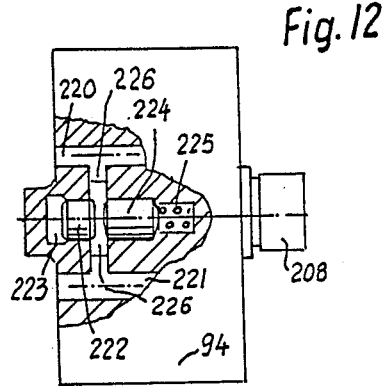
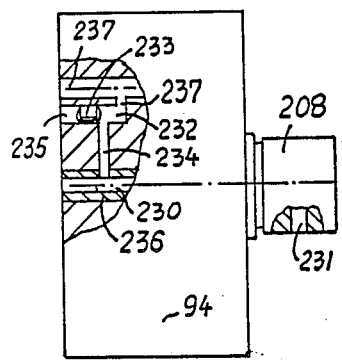

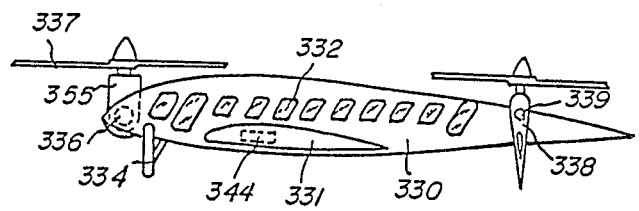
Fig.20
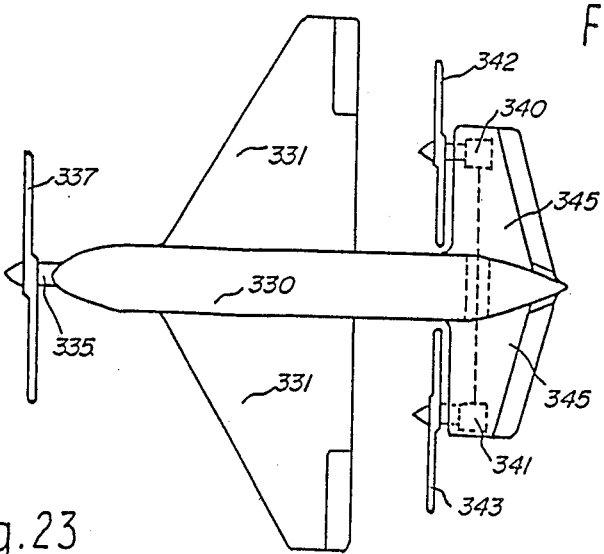
Fig.21
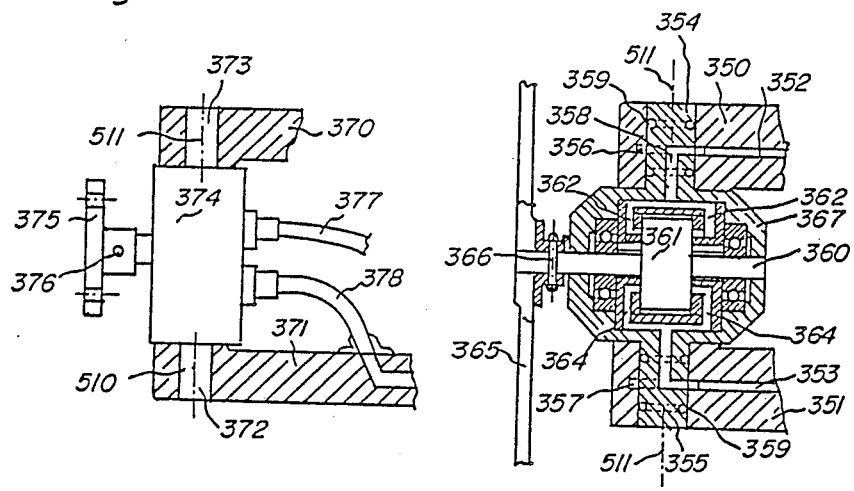
Fig.23
Fig.22

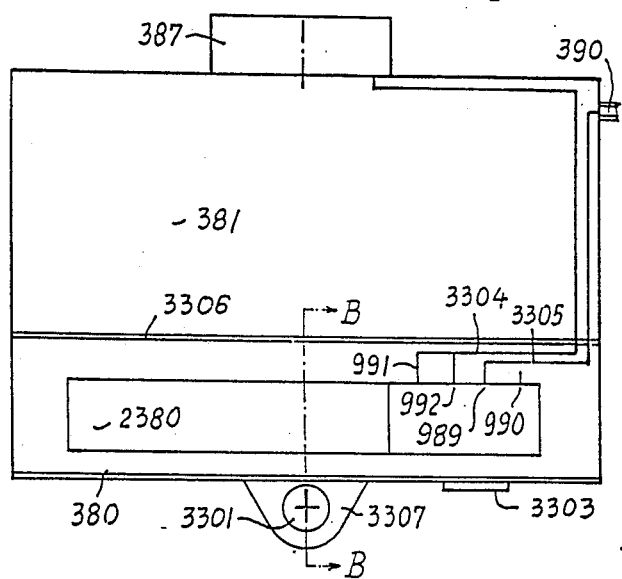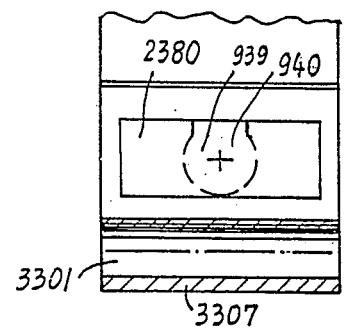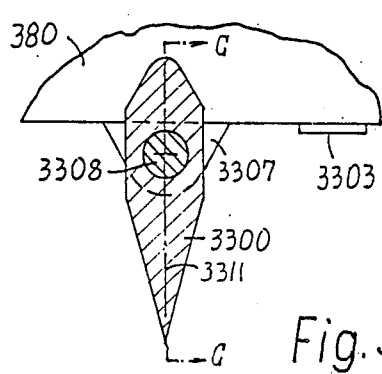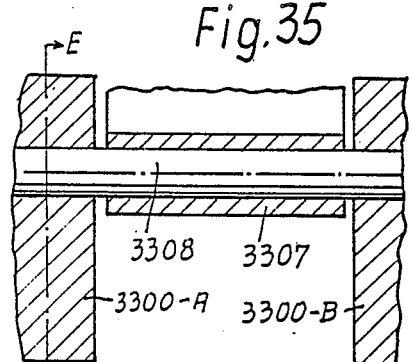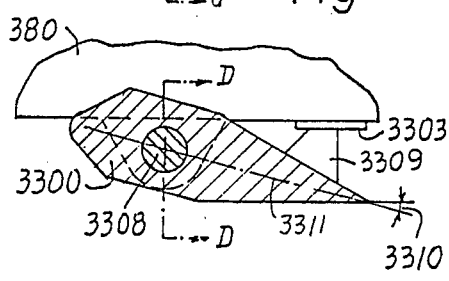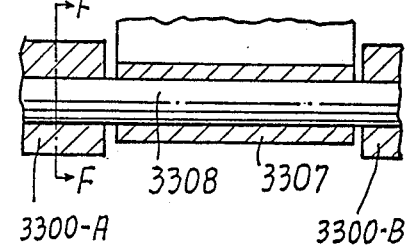

AIR BORNE CRAFT, FOR EXAMPLE HELICOPTER, AND RELATED DEVICES

REFERENCE TO RELATED APPLICATIONS

This is a continuation in part application of my at filing date of the present application co pending applications Ser. Nos. 06-621,638, filed on June 18, 1984 and Ser. No. 06-943,220, filed on Dec. 17, 1986 now abandoned. Ser. No. 621,638 issues as Patent No. 4,703,906. Appliation Ser. No. 06-943,220 was filed as a continuation in part of Ser. No. 06-619,958, filed on June 12, 1984, and both applications Ser. Nos. 06- 621,638 and 619,958 were filed as continuation in part or divisional applications of my earlier application Ser. No. 06-243,324, filed on Mar. 13, 1981, issued as Patent No. 4,456,430 on June 26, 1984. Application 06-619,958 issued as Patent No. 4,630,528 on Dec. 28, 1986. Application 243,324 was a continuation in part application of my earlier application Ser. No. 954,555 which was filed on Oct. 25, 1978 and is now patent No. 4,358,073 and also a continuation in part application of my earlier patent application Ser. No. 110,157, filed on Jan. 7th, 1980. The mentioned earlier application Ser. No. 954,555 was a continuation in part application of Ser. No. 800,756, filed on May 26th, 1977, now abandoned, and said application 800,756 was a continuation in part application of the earlier application, Ser. No. 465,413, now abandoned, filed on Apr. 30th, 1974, under title: "Vehicle for travelling in the air and on the ground equipped with hydraulically driven propellers"; and this is partially also a continuation in part application of my earlier patent applications Ser. No. 610,872, now abandoned, of Sept. 8th, 1975, entitled: "Hydraulically controlled fluid stream driven vehicle" and Ser. No. 610,871 of Sept. 8th, 1975, entitled: "Hydraulically controlled fluid stream driven vehicle", now Patent No. 3,790,105; whereof the latter two patent applications are divisionals of former patent application Ser. No. 416,237, filed on Nov. 15th, 1973, now abandoned and which was a divisional patent application of patent application Ser. No. 131,782 of Apr. 6th, 1971, now U.S. Pat. No. 3,790,105, issued on Feb. 5th, 1974, whereby benefit for this present divisional patent application is claimed of Apr. 6th, 1971; Nov. 15th, 1973; Apr. 30th, 1974; Sept. 8th, 1975; May 26th, 1977; and of Jan. 7th, 1980.

The above mentioned application Ser. No. 110,157 was a continuation in part application of Ser. No. 895,687 filed Apr. 12 1978, now abandoned.

Application 895,687 was a continuation in part application of my earlier application, Ser. No. 760,006, filed on Jan. 17th, 1977. Application 760,006 is now Patent No. 4,136,845 and issued on Jan. 30th, 1979. Application Ser. No. 895,687 is now abandoned. Application 760,006 was a continuation in part application of my still earlier application Ser. No. 104,676, filed on Mar. 8th, 1971, now U.S. Pat. No. 3,823,898.

Application 104,676 itself arrived from earlier applications, which are mentioned in now granted U.S. Pat. No. 3,823,898. The eldest application therein is application Ser. No. 328,395 of Dec. 5th, 1963, now patent 3,220,898. Another important application therein is application Ser. No. 551,023 of May 18th, 1966, now abandoned. Priority for the equalness of rates of flow in flows to hydraulic motors which drive propellers is thereby substantiated by application Ser. No. 328,395 of Dec. 5th, 1963, and the benefit for the use of such drive to propeller vehicles forward and maintain their straight forward path by equally driven propeller pairs wich one propeller of each pair on another side of the vehicle is obtained by application Ser. No. 551,023 of May 18th, 1966.

Partial benefit is thereby also claimed of application 110,157 and of its fore-runners as shown above, namely of:

Jan. 7th, 1980; Apr. 12th, 1978; Jan. 17th, 1977; Mar. 8th 1971; May 18th, 1966 and Dec. 5th, 1963.

BACKGROUND OF THE INVENTION (a) Field of the Invention

This invention relates to hydrostatic motors, pumps and vehicles, which have revolvable members, which are driven thereby. The aim of the invention is to improve especially the motors and vehicles by adding additional arrangements to the motors which may operate independently of the main fluid flow or depending thereon and whereby arrangements are obtained, which over a one-way clutch means or over a free-wheeling arrangement or over an axially moveable member supply specific features or safeties to the respective vehicle. The vehicle itself may be a road vehicle, a waterborne vehicle or an airborne craft.

(b) Description of the Prior Art

In road vehicles it has become necessary and is, in some countries, required by law, that the vehicle has a brake on the fluid motors which drive the wheels or tracks. A coupling was, therefore, mounted around the shaft of the motor and supplied with fluid for action against a spring means through the outside of the housing of the motor. The control fluid supply from radially outside through the housing is, however, inconvenient and in addition the entering fluid is prevented or braked from radial inward flow at high speed of the revolving clutch or coupling. The control devices of the known art are therefore, ineffective at high rotary speeds of the motor.

In vertically taking off and landing airborne craft, for example, in helicopters, it was common to switch the propeller blades to auto-rotation when an emergency landing was required. When, however, the pilot misjudged the situation or acted too late or incorrectly, it could happen that the craft would crash.

SUMMARY OF THE INVENTION

By the invention the control fluid is led through the center of the rotor and enters the to be controlled members, like coupling, clutch, wheel, propeller or others, or their control devices like small fluid motors or hydraulic or pneumatic cylinders or pistons radially from inside or in an axial direction or in an inclined direction between. These directions of control flow of the invention make the control and remote control possible also at the very highest rotary revolutions of the rotor and members. At the same time the inconvenience of fluid lines outside of the housing are prevented. The control fluid enters the motor from its axial end and thereby the control fluid lines radially of the housing are spared and radial excessive space is prevented by the invention.

It is an object of this invention to provide improvements of hydraulic or pneumatic fluid motors with control of members attached to said motors.

A specific object of the invention is to provide a control flow through a hollow rotor of a fluid motor and the means for effecting said control flow through said motor and sealing it in said motor.

A further object of the invention is to provide a control flow to an arresting member associated to a rotary member of the motor for arresting the same and prevent rotation.

A further object of the invention is to provide a remote control to members associated to the fluid motor.

A still further object of the invention is to provide a control for an axial or radial move of a member associated to the fluid motor.

Another object of the invention is to provide an angular control to a member associated to the fluid motor.

Still another object of the invention is to provide a control for a variable pitch of a member or propeller associated to the fluid motor and revolved by said fluid motor.

A further specific object of the invention is to provide a control of a propeller from autorotational pitch to a stiffer angle of attack or, in other words, for a stiffer pitch when fluid under pressure enters the motor.

A still more specific object of the invention is to control the pitch of the propeller by the rate of pressure in the fluid motor.

A very specific object of the invention is to provide a further control flow for additional increase of the angle of attack of a propeller, for example, when a propeller is changed from lift to forward traction of a helicopter or aircraft.

Another object of the invention is to provide an airborne craft which can fly as a gyrocopter, but take off vertically as a helicopter by taking off with lift propeller driven by fluid driven lifting motors while the vehicle in forward flight is driven by other propellers driven by other fluid motors and where said fluid driven lift motors may include means for allowing the propellers and/or rotors of said lifting motors when no pressure fluid is supplied to said lifting motors.

Another very specific object of the invention is to provide two separate fluid control means through the rotor or otherwise to the member associated to the motor.

The invention contains still further aims and objects, which are, for example:

to provide an airtravel vehicle consisting of a structure built at least partially by fluid lines;

to provide a propeller speed synchronization by proportionateness of rate in flow in separated flows;

to provide over-running one way coupling means in motors or in members attached thereto;

to provide or attach one way over running hydraulic means;

to provide helicopters with gyrocopter variations or vice versa;

to provide a vehicle with inclination variation of its propellers;

to provide an airborne vehicle with a tiltable upper structure;

to provide pre-speed up gear means to hydraulic motors;

to provide an aircraft with pivotable propeller and tail structure;

to provide pivotable hydraulic motors in holders;

to provide pivotable fluid motors in fluid supply holders;

to provide a copter with pivotable tail rotor and/or with pivotable, tiltable main motor and propeller;

to provide a double pump set to an engine or engines for elimination of friction;

to provide a new propulsion-system capable of x times mach speed without the use of heat sensible turbines;

to provide said system to vertical take off matters;

to provide separatable and transportable fluid motor holding body structures consisting mainly of fluid lines;

to provide a combination one way valve set for fluid motors;

to provide two- or multiple propeller vehicles with fluid motors;

to provide inclinable, pivotable propellers or ducts with propellers; and, to provide multiple separated flow pumps with effective design for proportional or equal rate of flow delivery in separated fluid lines by effective design improvements.

Another object of the invention is to provide a gyro-helicopter which takes off vertically but applies either helicopterlike forward traction or forward traction as a gyrocopter or a combination of both.

But the most important object of the invention is to provide a multi-rotor, hydraulically driven vertical take off vehicle with substantially vertical axes of the propellers, which includes in the arrangement of the invention an automatic auto-rotation of the rotor blades, when the pressure in the main fluid lines to the propeller-driving fluid motors drops below a pre-determined value of fluid pressure.

In the preffered embodiment of this kind of vehicle, multiple propeller sets are applid with substantial vertical axes diametrically to the body and gravity center of the vehicle to keep the vehicle stable and upright in the air without tail-rotor requirement and wherein the invention applies a synchronized automatic auto rotation of all rotor blades, when a power failure or a fluid suplly failure occurs partially or entirely. The vehicle will then descend automatically to the ground as a helicopter in auto-rotation of the rotor blades, but without the need of starting of the emergency landing by autorotation actuation control.

More details will become apparent from the detailed description of the figures and of the embodiments of the invention, which are described more in detail in the following in this specification.

BRIEF DESCRIPTION OF THE DRAWING

FIG. 9 is a partial longitudinal sectional view through another embodiment of another fluid motor of the invention.

FIG. 10 is a cross-sectional view through FIG. 9 along the line IX—IX.

FIG. 11 is a partial longitudinal sectional view through still another assembly of the invention.

FIG. 12 shows a partial sectional longitudinal view through still a further assembly of an embodiment of the invention.

FIG. 13 is still another longitudinal sectional partial view through another arrangement of the invention.

FIG. 20 is a view from the side onto a vehicle of the invention.

FIG. 21 is a view from top onto the vehicle of FIG. 20.

FIG. 22 is a longitudinal sectional view through an holding- and fluid motor arrangement of the invention.

FIG. 23 is a sectional view through holders, holding a fluid motor.

FIG. 25 shows a portion of the craft of FIG. 18 in an enlarged scale, seen from the side.

FIG. 26 is a sectional view through a portion of FIG. 25 along the arrowed line B—B of FIG. 25.

FIG. 34 is a sectional view through FIG. 35 along the arrowed line E—E of FIG. 35.

FIG. 35 is a sectional view through FIG. 34 along the arrowed line C—C of FIG. 3

FIG. 36 is a sectional view through FIG. 37 along the arrowed line F—F of FIG. 37

FIG. 37 is a sectional view through FIG. 36 along the arrowed line D—D of FIG. 36, while FIGS. 34 to 37 illustrate details which are related to FIG. 25.

DESCRIPTION OF THE PREFERRED EMBODIMENTS

Figure 1:
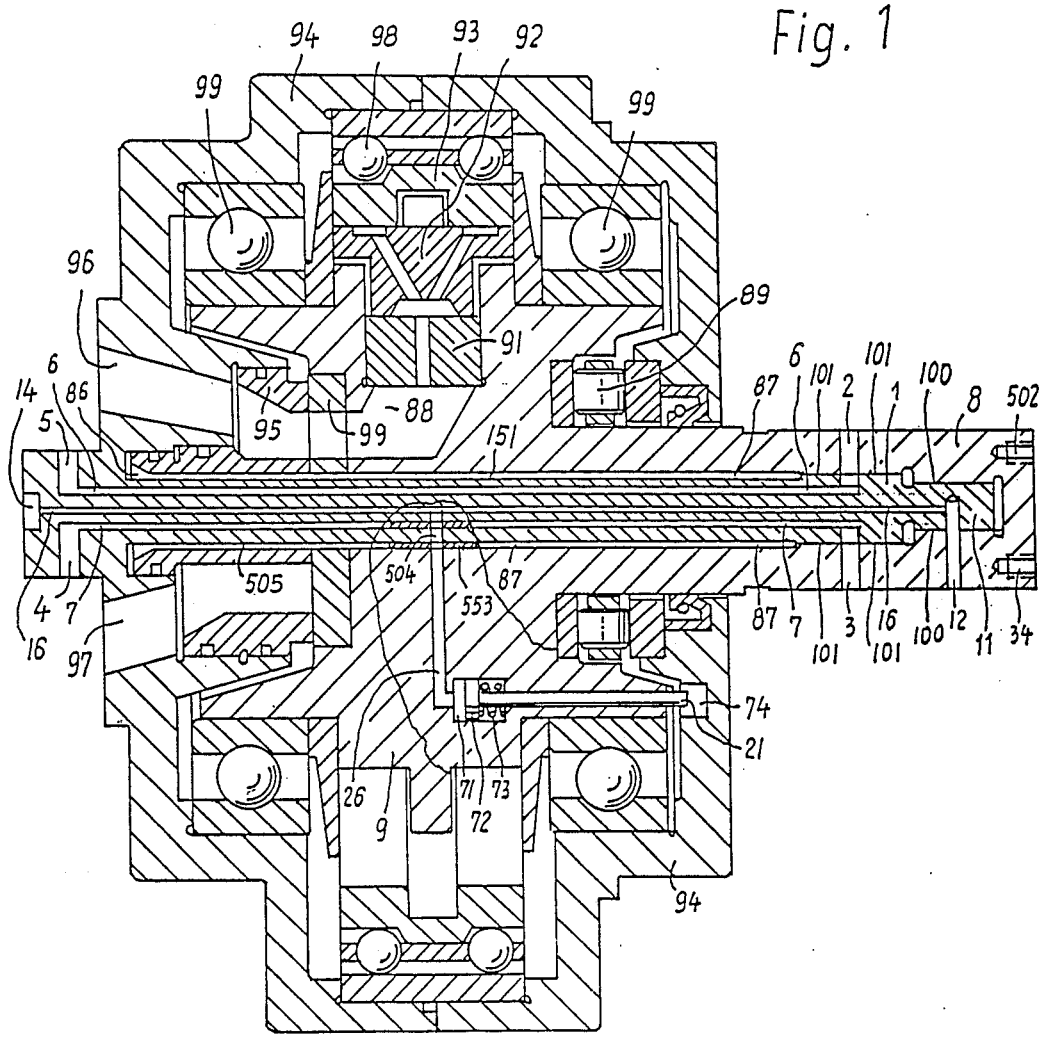
FIG. 1 is a longitudinal sectional view through a motor of an embodiment of the invention.

Referring firstly to FIG. 1, an hydraulic motor or fluid motor of the radial piston type is demonstrated. As it is known from the former art especially from U.S. Pat. Nos. 3,223,046; 3,225,706; 3,270,685; 3,277,834; 3,304,883; 3,305,195; 3,398,698; 3,468,262; 3,697,201; 3,831,496; 3,850,201; 3,889,577 or others, rotor 9 is revolvably borne in bearings 99 in housing 94. The rotor 9 contains cylinders or working chambers 88, wherein the displacement members or pistons 91 move radially inwards and outwards. Piston-shoe(s) 92 are associated to the piston(s) and radially guided by actuator 93. Actuator 93 may be a ring and be borne revolvably in bearings 93 also in housing 94. The axis of actuator 93 is distanced by an eccentricity "e" from the axis of the rotor 9, thereby causing the pistons and shoes to travel 2 times "e"=piston stroke, inwards and outwards. During outward move the pistons suction fluid through entrance port 96 and expell it through exit port 97 during the inwardly directed stroke. A fluid flow thrusting- and sealing-control body 95 may be assembled and contain passages wherethrough the fluid flows. A rotary control plate 95 may be inserted between the said thrust body 95 and the end of rotor 9 for the possibility of applying slidingly matching materials with little friction losses and high relative speed slide capability. Said rotary plate may also have passages, matching with the respective passages in the rotor 9. A thrust bearing 89 may be assembled for bearing the thrust of thrust body 95 against the rotor. Said bearing may be placed before the rotor and within the housing 94. Rotor 9 may have a shaft 8 which can be fitted to the rotor 9 or be integral therewith. Instead of using a radial piston motor, it would also be possible to use an axial piston motor, if such rotor of the said axial piston motor has a shaft or rotor going axially through the housing 94 without inclination of the rotor axis relative to the axis of the housing. It would further be possible to use in a respective housing of the motor a radial vane machine, gear motor, trochoid motor or a vane machine of inventor's patents: 2,975,716; 3,158,103; 3,099,103; 3,111,905; 3,186,347; 3,173,375; 3,255,705; 3,246,574; 3,256,831; 3,269,329; 3,280,757; 4,184,820; 4,213,746; 3,301,232; 3,274,945; 3,263,621; 3,269,371; 3,320,898; 3,320,897; 3,379,006; 3,417,706; 3,412,686; 3,386,387; 3,416,460; 3,694,114; 3,844,685; 3,873,253 or others.

As far as it is mentioned above, that these units might be utilized in FIG. 1 it is also true that they, might be used in any other housing of one or the other fluid motors of the other respective Figures of the drawings of this application.

According to the invention, the rotor 9 is provided with a central rotor bore or hub parallel to the axis of the rotor 9. Said bore has referential 87. A stationary passage body 1 is inserted into bore 87 and it has a fitting portion 101 which tightly seals in a respective seal-portion in the shaft 8 or rotor 9. At the main extension however, passage body 1 and bore 87 may provide a wider clearance 86. Thrust body 95 may also have a respective bore 86, through which the passage body 1 can extend. Shaft 8 or rotor 9 may have a fluid control passage 12 extending out of said shaft 8 or rotor 9. Control fluid passage 16 may extend from control passage port 14 preferably located at the end of the housing 94, through passage body 1 to meet control fluid passage 16. Fluid for the control of a member, which may be associated to the shaft can be passed through said passages and port. Heretofore it was explained that control flow passages may be extended through or partially through the rotor or shaft. In the following it will from now on be written through the shaft or at other places it will be written through the rotor. Regardless, however, if rotor or shaft is written, it should be understood, that it can be either the shaft or the rotor. In addition there may be, but not in all cases necessary, further control fluid passages provided to extend from passage port 4 or 5 partially through passage body 1. For example, control fluid passage 6 may extend from port 5 partially through passage body 1 into control flow passage 2 which may extend out of said shaft to control another function of the member which is associated to the shaft 8 or to control an additional member associated to shaft 8. Still a further control fluid passage 7 may extend from port 4 partially through passage body 1 to meet control passage 3 for a further control of another function or member. Thus, having established at least one control fluid passage through passage body 1 to at least one control fluid control port 12, it can now, according to the invention, control at least one function of at least one member which may be fastened to shaft 8. The further control flow control ports 2 and 3, if provided, may control further functions or members. The control can now be done from stationary portions of housing 94. It is convenient to do so from the end of housing 94, as it is demonstrated in the Figure. Because from the end of the housing fluid lines can be set easily to remote places for a remote control of the desired functions. The fitting portion in shaft 8 is revolving, while the passage body 1, which fits therein tightly sealing, is stationary. Stationary means relative to the housing, and so means rotary. Thus, if the housing revolves, passage body 1 revolves too, and shaft 8 and rotor 9 may then be stationary. That is the reversal of the fluid machine. Control ports and passages 2,3,12 may be axially distanced from each other in order to keep the respective control-flows separated from each other. It is, however, also possible, to locate them at same radial face at same axial distance, as for example, control ports 2 and 3, in order to control the control flows for exerting control functions at different rotary angles of shaft 8. Thereby different controls of members associated to shaft 8 can be controlled at different rotary angles.

For arresting the rotor 9 and shaft 8 an arresting recess 74 may be provided for example in the housing 94. An arresting pin 21 may be provided in rotor 9. The arrangement of housing and rotor might be reversed. Piston 72, associated to arresting pin 21 may be spring-loaded by spring 73 from one end and fluid pressure loaded from the other end, from chamber 71. Passage 26 may extend from one of the passages 6,7,16 of passage body 1 to thrust chamber 71. Thus, arresting pin 21 can be by remote control entered into arresting recess 74 for arresting the rotor 9 and shaft 8 preventing rotation of them.

Figure 1A:
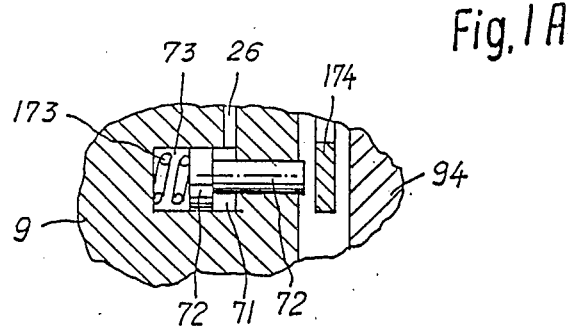
FIG. 1A shows a portion of FIG. 1 with another embodiment therein.

In FIG. 1A an opposite loading of stopper pin 72 is shown. FIG. 1A may be provided in FIG. 1 instead of the chambers, pin, spring, passage as discussed at end of last paragraph. Passage 26 may lead control fluid into thrust chamber 71 and thereby press piston 72 against spring 173 in space 73. Pin 72 is thereby taken away from arresting clutch plate or arresting portion 174. If fluid pressure leaves chamber 72, the spring 173 will press piston and pin 72 against arresting member or clutch disc 174 and said disc 74 against housing wall portion 94. Thus, the spring will automatically arrest the rotor 9 and shaft 8 at times when no fluid is supplied. That is the case, when the vehicle is resting. For starting the vehicle, fluid is entered into chamber 71 and thereby the arresting is opened, so that the rotor 9 and shaft 8 can revolve. Control passage 26 can also be extended to an main entrance port or passage of the motor. That has the effect, that the arresting assembly 173,73,72,71,26,174,94 opens automatically when working pressure fluid is led to the motor. It spares specific remote control of the arresting arrangement by an operator.

Figure 18:
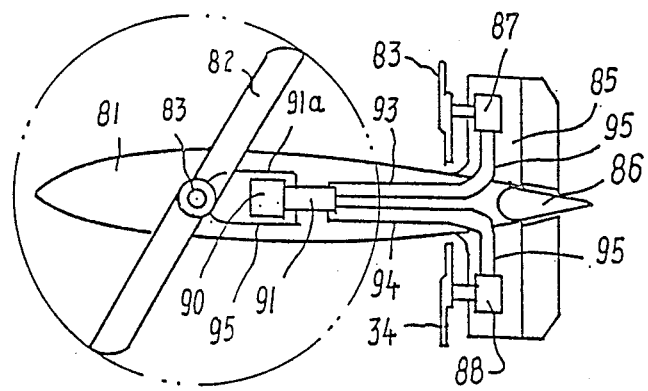
FIG. 18 shows still another embodiment of an aircraft of the invention seen from above.
Figure 19:
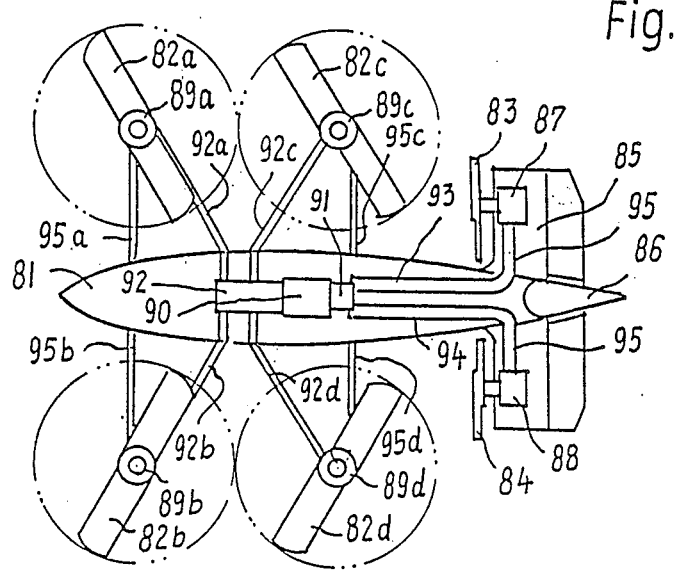
FIG. 19 shows a still further aircraft of the invention, seen again from above.
Figure 24:
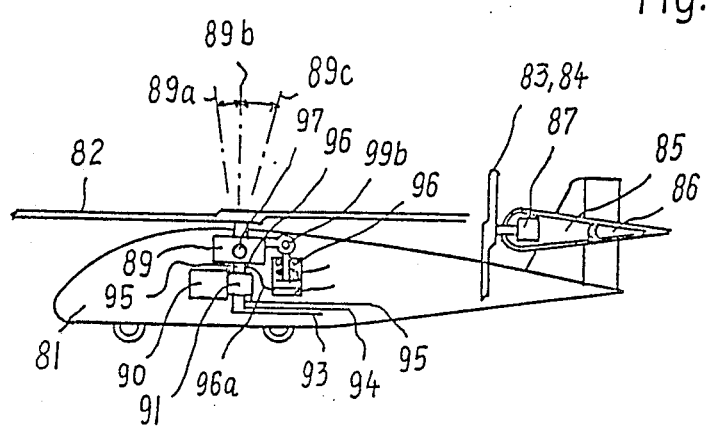
FIG. 24 is a view from side towards another vehicle of invention.
Figure 27:
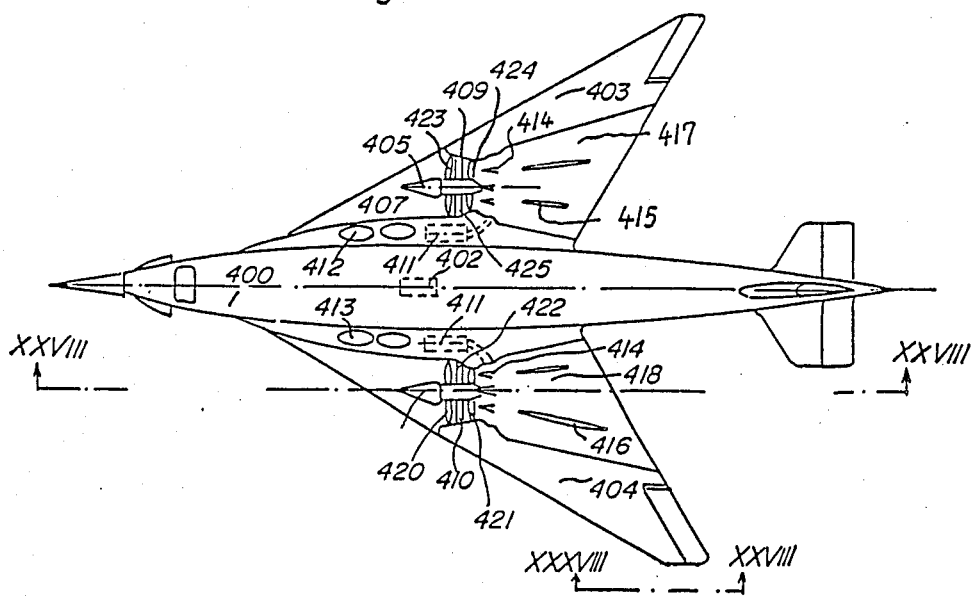
FIG. 27 shows another vehicle partially in section partially from top.
Figure 28:
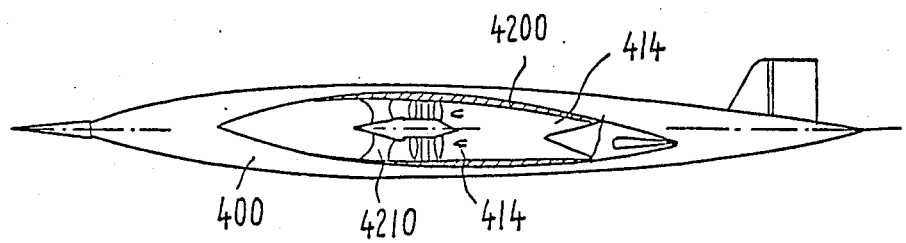
FIG. 28 is a sectional view through FIG. 27 along line XXVIII—XXVIII.
Figure 29:
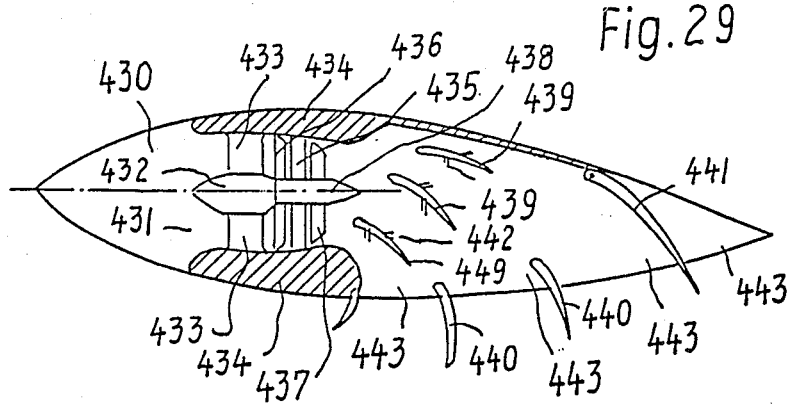
FIG. 29 is a longitudinal sectional view through another device.
Figure 30:
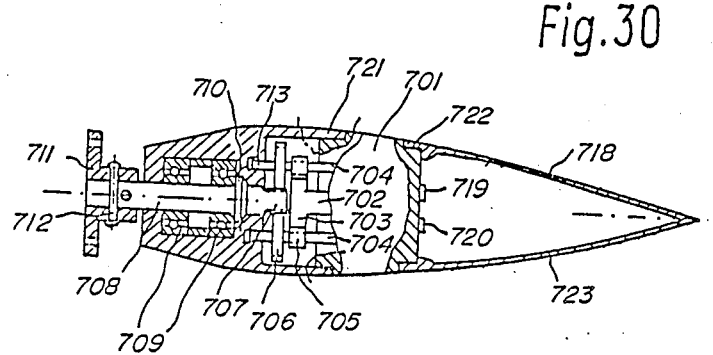
FIG. 30 is a partially view from a side and partially a longitudinal sectional view through an assembly of the invention.

The arresting means 71 to 73 with 21,74 of FIG. 1 as well as the arresting arrangements 71 to 73,174,94,9,26 and 173 of FIG. 1-A are also to be used for the arresting of propellers 82 and 82a to 82d of FIGS. 18, 19 and 24 to set these propellers to rest in the direction of propeller 82 of FIG. 24; meaning that the arms of the propellers then are arrested parallel to the longitudinal axis of the respective vehicle of these Figures.

Figure 2:
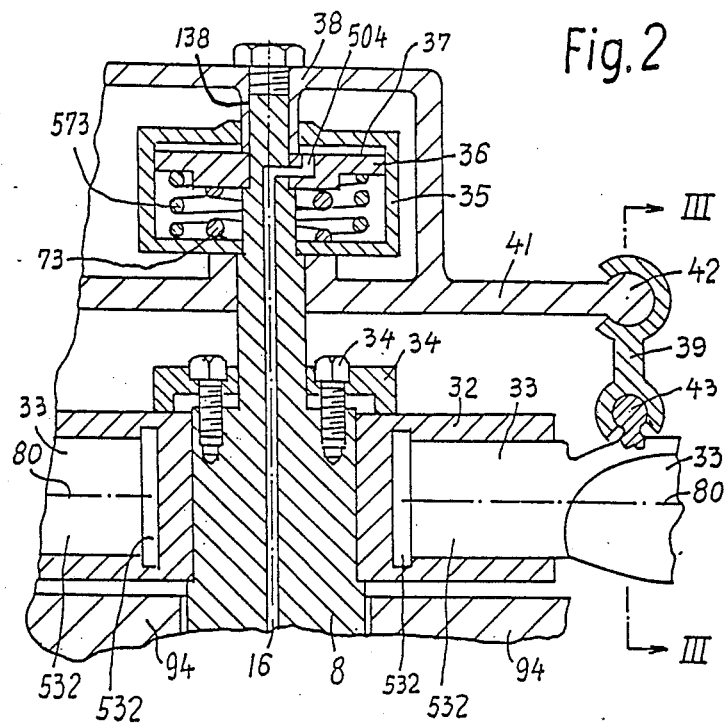
FIG. 2 shows another embodiment of control means in longitudinal sectional view.
Figure 3:
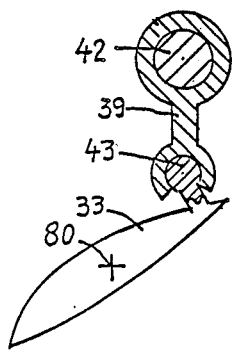
FIG. 3 is a cross-sectional view through FIG. 2 along line III—III.

In FIG. 2 and thereto belonging partial sectional view 3 a propeller holder or member holder 32 is fastened to shaft 8 by fasteners 34. Holder 32 has at least one preferably cylindrical and hollow bearing portion 33. It is preferred to set two, four or any other number of such bearing portions. Pivotable members 80 are kept in the bearing portion(s) 33 to be able to pivot therein around pivot axis (axes) 80. The pivotable member(s) 80 shown in FIGS. 2, 3 can be the feet of propellers 33. These Figures further show an axially moveable control member 41 mounted to shaft 8 to be axially moveable on shaft 8. The top of FIG. 2 shows a stopper nut and the moveable member 38 is shown in the uppermost position, where it is prevented from further upwards movement by end nut 38. From end nut 38 arresting bush 138 extends along shaft portion 8 to arrest axially moveable member 36 in the uppermost position. In housing 35 the spring members 72,73 are located to press against moveable member 36 and to press the same upwards. On top of moveable member 36 is within housing 35 the fluid pressure thrust chamber 37 provided. Passage 16, known for its functions from the discussion of FIG. 1, extends into thrust pressure fluid chamber 37. When fluid under respective pressure is led through control flow passage 16 into chamber 37, the moveable member 36 is moved from its uppermost or from a first position into a second, third or further position depending on the extent of the fluid pressure and the fluid pressure action against the spring means 73,573. Axially moveable member 36 is fastened to moveable transmission member 41. During move of member 36 the transmission member 41 moves in unison with member 36. During this move member 41 slides along bush 138 and may be guided at this move by a portion of shaft 8. Transmission member 41 may have at least one bearing portion 42 and each pivotable member, propeller, or propeller-root of propeller blades 80,83 may have another bearing portion 43. Pivotable or spherically swingable connection member 39 may embrace both bearing portions 42 and 43 and thereby connect moveable member 36 over member 41, bearing portion 42, connection member 39 to bearing portion 43 of the pivotable member or propeller 80, 33. Thus, when axially moveable member 36 moves, the movement is transferred to pivotable member 33, 80 to pivot the same in holding portion 32. It is preferred, that in the first, the spring loaded position, when no pressure is in chamber 37, the propeller 33 is in autorotational angle of attack, when the motor is applied in a helicopter. And to be in the starting low angle of attack position when applied to an aircraft for horizontal move. Fluid passage 16 may either be set to a high pressure main fluid line, which carries fluid to drive the motor or be set to a separated control fluid line. When communicated to the main supply fluid line, pressure in fluid in the motor, which revolves the rotor and shaft of the motor will automatically press the propellers into a position of higher angle of attack. Thus, the helicopter will lift or the aircraft will fly with speed. Any higher pressure in fluid will supply and create a higher angle of attack of the propeller. But, when due to an engine failure or fluid line brake the pressure in chamber 37 becomes down, the springs 72, 73 will automatically set the angle of attack of the helicopter propeller into the auto rotational angle of attack. Thus, the helicopter will automatically have autorotation for an emergency landing, when the supply of driving fluid to the fluid motor fails. The embodiment of FIG. 2 of the invention, thus, supplies a high safety to fluid pressure driven helicopters and assures an autorotation even, when the pilot would fail to take action for autorotation in an emergency. FIG. 3 illustrates how axial movement of member bearing 42 effects the pivoting of pivotable member or propeller 33 around axis 80 of holding portion 32 of FIG. 2.

Figure 4:
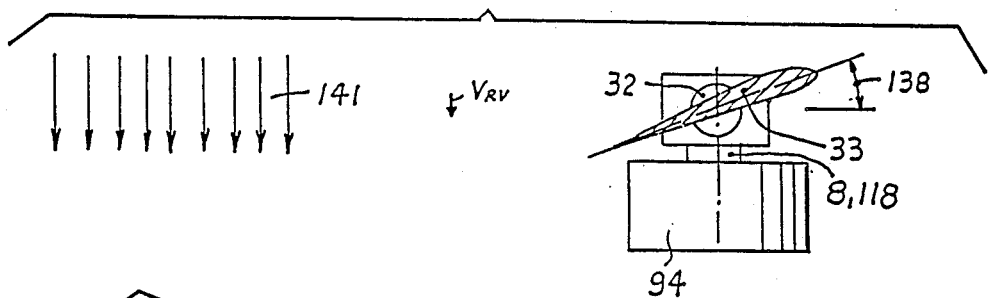
FIG. 4 is a schematic showing a first propeller blade angle; which can be varied according to FIGS. 5 or 6.
Figure 5:
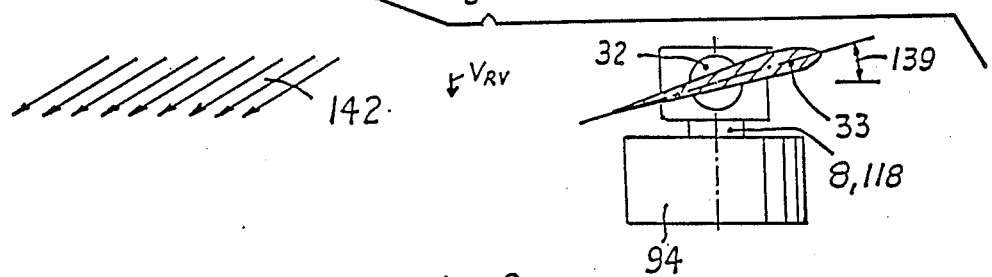
FIG. 5 is a schematic, showing a second propeller blade angle.
Figure 6:
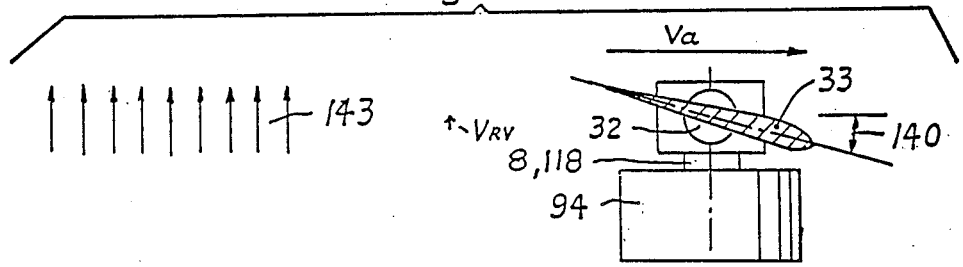
FIG. 6 is a schematic, showing a third propeller blade angle.
Figure 42:
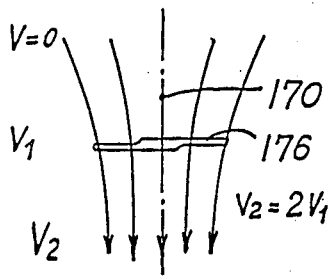
FIG. 42 is a schematic demonstration of the fluid flow through a propeller with substantial vertical axis.

FIGS. 4 to 6 will be described later at hand of a vehicle wherein they are preferred to become employed.

Figure 7:
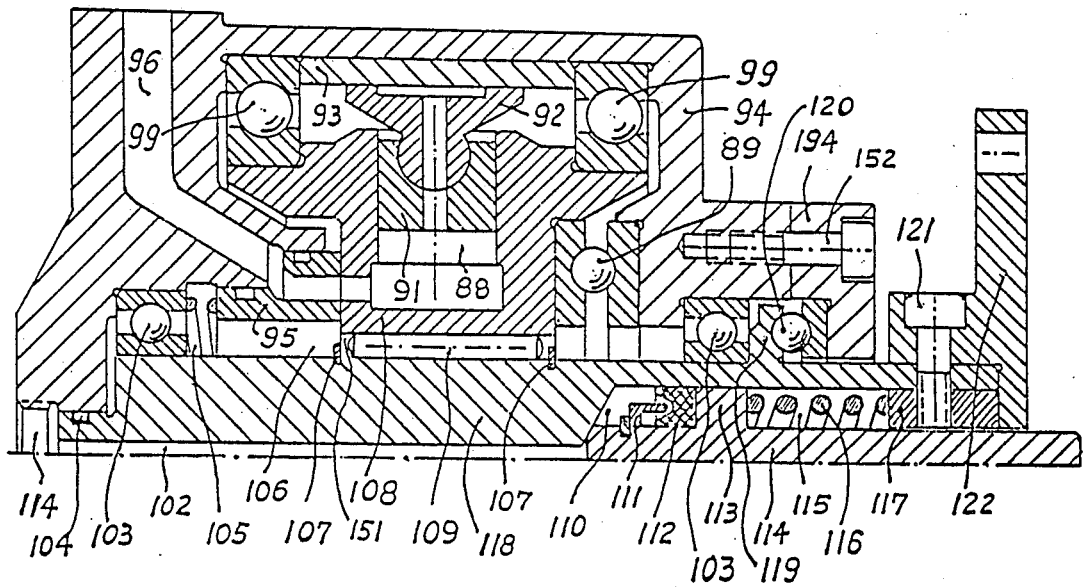
FIG. 7 is a longitudinal sectional view through another embodiment of a fluid motor of the invention.

In FIG. 7 the upper portion in a sectional longitudinal view of another embodiment of the invention is shown.

A common hydrostatic fluid motor with a thereto provided novel combination; wherein the common fluid motor 94 provides rotatably borne in a housing 94 a rotor 108 having working chambers 88 with displacement members 91, 92, 93 for the periodic intake and expellation of fluid during each revolution of said rotor when said chambers periodically increase and decrease their volumes at said revolution while said fluid flows from an entrance port through passages in the respective chamber(s) of said working chambers and out therefrom through respective passages over a control body 95 through an outlet port 96; and wherein said novel combination provides in combination with said common hydrostatic fluid motor; the following combination:

first: a space 151 extending through the center of the rotor 108 from one end thereof to and through the other end of the rotor, second: a revolvable shaft borne by bearings 103 radially and revolvably independently of the rotor with a rotary velocity which may become higher than the rotary velocity of the rotor and the shaft 118 extending through the space 151 of the rotor whereby the shaft 118 extends at least at one end of the motor out of the motor;

third: a one-way clutch provided between the rotor 108 and the shaft 118 which includes clutch-members 109 and a respective configuration of the faces of the shaft and of the rotor to permit a free wheeling of the shaft 118 relative to the rotor 108 in one rotary direction and to engage and fix the shaft to the rotor in the other rotary direction to drive the shaft by the rotor in the other rotary direction;

fourth: a bore 102 in the shaft 118 extending axially therethrough and into an axially extending cylinder 110 provided in the shaft 118 and open to one axial end thereof;

fifth: An axially movable piston 114 provided in the cylinder 110 with a shoulder 113 sealingly fitted in the cylinder 110 and subjected at one axial end to fluid pressure in the cylinder 110 and subjected at the other axial end thereof to a spring 116 which may be inserted in cylinder portion 115 of the cylinder 110 whereby the spring thrusts in a direction contrary to the direction of the fluid pressure onto the shoulder and the piston 113, 114;

sixth: a sealing portion 104 provided on the shaft 118 and extending into a portion of the housing 94 to seal the rotatable shaft 118 in the housing 94 even when the shaft revolves in the housing whereby the sealing portion the a control flow port 114 which is provided in the housing and separated from the motor-driving entrance and exit ports of the motor to be and remain discommunicating with the entrance and exit ports; while the control flow port 114 is communicating with the bore 102 in the shaft 118 and thereby with the cylinder 110 of the shaft 118;

seventh: a radial shoulder 119 provided on the shaft 118 and subjected to an axial thrust bearing 120 provided in the motor to prevent the escape of the shaft 118 out of the motor and its housing 94 and to provide to the shaft 118 a capability to carry an axially directed load on the shaft;

eigth: fastening means 117, 121, 122 provided on the shaft 118 to provide to the shaft 118 the capability to fasten thereon an accessory in the axial and rotary direction of the shaft 118;

whereby the motor is provided with a capability to be driven by fluid which flows through the entrance and exit ports in at least one rotary direction; to drive the shaft 118 in the rotary direction; to permit the shaft 118 to overrun the rotary velocity of the rotor 108 of the motor; to permit the piston 114 to reciprocate in the cylinder 110 in response to the pressure in the fluid in the control flow port 114 and to permit the shaft 118 to carry an axially directed load independently of the pressure in the chambers.

Rotor 108 may be borne in bearings 99 for radial load and on bearing 89 for axial load in housing 94. The housing portion 194 is provided separately on said housing 94 to permit the assembly of bearings 103 and 120. It will be fastened by bolts 152 to housing 94 after the assembly is completed. Shaft 118 may be borne in bearings 103 in housing 94 or in the rotor 108. Bearing 120 might also be provided between shaft 118 and rotor 108 instead of between the shaft and the housing. Bolts 121 may also fasten arrester 117 together with propeller flange or flange 122 on shaft 118. Arresters 117 may load the spring 116 and springs 105 may be set onto the end of the control body 95 to press it against the end face of the rotor 108 for sealing of the flow of fluid to and through and out of rotor 108. In FIG. 9 and 10 the housing of the fluid motor, which is illustrated in FIG. 9 contains in the known way the usual arrangement including rotor 209. Rotor 209 is hollow. Shaft 205 extends from the rotor in at least one axial direction and a portion of the shaft is located in the hollow rotor 209. Overrunning one-way clutch means are provided between shaft 205 and rotor 209. They may consist of rollers or balls 202 and inclined faces 204. The shaft 205 may have a flange 228 constituting a thrust bearing to run along the thrust bearing guide face portion 229 of housing 94.

The purpose of this arrangement is to provide a one-way overrunning coupling between the rotor and the shaft. This feature is especially applied in helicopters or gyrocopters. In helicopters for autorotation of the propeller, which is associated to the shaft of the motor. Thereby accidents can be prevented because the pilot does not need any more to take care of autorotation levers. The autorotation occurs by itself when the engine fails because when the rotor 209 stops to revolve the overrun coupling means permit the shaft to continue to revolve. There are other applications of this arrangement too, but the autorotation of a helicopter is the best understood and known. In a gyrocopter the fluid motor may serve for vertical take off. Later, when the gyrocopter has obtained forward speed the propeller starts to revolve faster and runs then with faster speed than the rotor 209 does. The overrunning coupling means of these and other figures of this application assure, that the propeller and shaft can revolve faster, than rotor 209. FIG. 10 shows the generally known arrangement of a one way overrunning coupling. However, applied in this case in the hollow rotor of the motor of FIG. 9 or in the propeller bush 207 thereof.

Instead of providing the overrunning coupling means in rotor 209 of FIG. 9 it may also be applied between shaft portion 206 and bush 207 of a revolvable member or propeller 239 of the right end of FIG. 9. Hardened bush 207 may be assembled in rotor member 339. A holding means 211 can be provided and fastened to shaft 205 for holding a thrust bearing 210. Because the rotor member or revolving member 239 may be a propeller and may apply thrust which could not be borne without excessive friction, if shaft 205 stops, but bush 207 and member 239 continue to revolve.

To set the overrunning one way coupling means around shaft portion 206 as shown in the right portion of FIG. 9 is very convenient when the rotor has no space for a centrical bore for bearing the shaft portion 205 therein or when by any other reason the motor has no coupling one way means. Thus, by utilizing the arrangement of the right portion of FIG. 9 any conventional fluid motor can be provided with the external application of a one-way overrunning coupling means as in the right portion of FIG. 9. Instead of providing the overrunning coupling means only in the rotor 209 or only in the external bush 207, both applications can be applied as shown in FIG. 9; i.e. one one-way coupling in the rotor 209 and another in the bush or revolvable member 207 or 239. This arrangement also shown only in FIG. 9 may similarly be applied in any other suitable fluid motor.

FIG. 11 shows a longitudinal sectional view through another fluid motor of the invention. This embodiment of the invention combines a one way overrunning coupling means and an internal pitch-angle of attack-inclination-or pivot adjustment or control means with a fluid motor. Housing 94 contains again the known motor arrangement including a hollow rotor 209. Shaft portion 203 is within said hollow rotor and overrunning one way coupling members 202 and thereto associated means, for example, as in FIG. 9 are provided between shaft portion 203 and hollow rotor 209. Shaft portion 203 has an outward extension 208. Both shaft portions 203 and 208 are partially hollow to contain passage body 201. Passage body 201 may be stationary or rotary, depending on design. Either the left or right end portion of passage body 201 is relatively rotary to the portion of housing 94 or of shaft 208 and sealingly fitting in the respective portion. Passage body 1 has a control fluid passage 220 which extends into transfer passage(s) or port(s) 219. Passage(s) 219 extend to a fluid pressure chamber 213 wherein a piston 214 is axially moveably fitted and sealed. Opposite of piston 214 the spring means 238 may be provided to act in contrary direction to the action of fluid pressure in chamber 213. So, that a power play appears between the forces in fluid in chamber 213 and the spring means or thrust means 238. Piston 214 moves more to the right or more to the left in FIG. 11 depending on the forces in chamber 213 and means 238. A holding member 212 may be fastened to shaft portion 208 by holding means 237. Holding member 212 may have radial bores or otherwise directed bores for the insertion of bush(es) 215. Bushes 215 may hold the feet or respective pivotable members or propellers 216 in holding member 212, so, that the pivotable members 216 may pivote in said member 212 but are otherwise strongly fastened by bushes 215 or other fastening means of holding member 212. The foot of each pivotable member 216 may have an eccentrically provided portion or means 217 for entering into a respective engagement with a reception or connection means 218 of a portion of piston 214. Thus, when fluid control flow presser is led to passage 220, which may be done from a remonte place, the said control flow pressure enters chamber 213 and drives the piston 214 rightward in the Figure and thereby varifies the angle of attack, pitch, inclination or pivot angle of pivotable member(s) 216 via the mentioned members 217 and 218. When the pressure in the control flow through passage 220 becomes reduced the varification of said angle of attack, inclination, pitch or pivot angle of said pivotable member(s) 216. Any desired pivot angle can be set by the respective hight of the pressure in the control flow.

The application of this motor is especially suitable for helicopter, gyrocopter or similar craft, and also for aircraft propeller. At vertical take off the suitable angle of attack is set by a medial fluid pressure in the control flow. At high forward flight of great speed the angle of attack becomes further increased by a still higher pressure in the control flow in passage 220. At an engine failure the spring means 238 automatically sets the angle of attack of a helicopter or gyrocopter propeller into the autorotational angle of attack, because the springs 238 are now stronger than the pressure in control fluid passage 220. At an engine failure there may be no pressure in line 220, because if no engine works any more, there is no fluid supply.

Heretofore mechanical means like one-way couplings have been used in the earlier figures to make a higher speed rotation for revolvable members possible to overrun the rotary speed or rest of the rotor of the respective fluid motor. Hereafter it will be shown at hand of FIGS. 12 to 15 that this helpful effect can also be reached by hydraulic control means within or on the respective fluid motor.

FIG. 12 symbolizes again a housing 94 with fluid motor members and a fluid motor assembly therein. It has an entrance port 220 and an exit port 221. Shaft 208 extends from the motor housing 94 as usual. According to this embodiment of the invention an overflow passage 226 is provided from entrance passage 220 to exit passage 221. It extends through a chamber 222 wherein a fitting position 224 is axially moveable. Spring means 225 presses piston 224 into the left position in the Figure. A control fluid flow entrance port 223 is associated and communicated to chamber 222. Normally the piston 224 is in left position which is the closing position. Passage 226 is thereby closed. However by sending pressure in a control fluid flow into port 223 and thereby into chamber 222 the piston 224 is moved against spring 225 into the right position, as shown in the figure. This is the opening position of piston 225. At the opening location of piston 225 the fluid in the motor can freely flow from entrance passage 220 through opened passage 226 into exit passage 221 or vice versa. Thus, the engine can be stopped and the shaft 208 can freely revolve, for example in autorotation, of a helicopter, when the motor of this figure is assembled to the propeller of a helicopter. Without opening of passage 226 this would not be possible. A resting pump, which is connected to the ports 220 and 221 of the motor would block any rotation of the rotor of the motor of the figure, because the fluid would be stopped in the expanding and contracting fluid operation chambers of the motor. The opening of overflow or transfer passage 226 of the invention however makes it possible that fluid of the decreasing chamber volumes can pass through passage 226 into the volume increasing chambers in the main chamber arrangement of the motor. Thus, an overrunning means is obtained by the passage 226 of the invention and this can even act in both rotary directions. It can be remote controlled by a control fluid flow to control flow port 223.

FIG. 13 shows a motor of a related ability. It may have a control flow passage 230 in passage body or other means 236 for the supply of controlling fluid to exit port 231 for handing the control of moveable members, if those are associated to shaft 208. The motor gain contains in housing 94 the respective motor assembly and has an entrance port 237 and an exit port not shown in the figure. A chamber 232 contains a relatively thereto moveable piston 233. At one end of chamber 232 is a communication passage provided to communicate with the entrance port 237. At the other end of chamber 232 may be a control flow entrance passage 235. From a position or location of chamber 232 which can be closed by piston 233, a further passage 234 may extend either to the exit port or to a further control flow passage, for example 230, depending on the actual requirement and design. The main supply fluid pressure from the entrance port 237 may thereby enter into chamber 232 to press the control piston 233 into the opening position. The main fluid pressure passes then on from entrance port 237 through chamber 232, passage 234 and control flow passage 230 into control flow exit 231 for controlling a moveable member of shaft 208. This gives an automatic control of the moveable member associated to shaft 208 by the pressure present in the main supply line. For example, a higher pressure in the main fluid supply line will result in higher motor rpm and at same time in higher angle of attack of a propeller associated to shaft 208 of this motor. The said control of angle of attack or like by main fluid supply flow can be prevented by sending a control flow of higher pressure into control port 235 for pressing piston 233 into the closing position in chamber 232. Instead of communicating passage 234 to the medial control passage 230 it is also possible to communicate the passage 234 to the entrance port of the motor. The piston 233 is then automatically in opening position as soon as main flow supply pressure enters the motor. An automatic overrunning ability is then provided. But it can be stopped, for example, for a vertical take off or landing, by sending a control flow of higher pressure into entrance passage 235 for moving the piston 233 into its closing position.

A further possibility is to use port 237 as the exit port of the motor. When an engine fails, the still revolving member on shaft 208 will attempt by kinetic energy to continue to revolve. That makes a pressure in the decreasing chambers of the exit half of the main chambers of the motor. This pressure enters exit passage 237 and forces the piston 233 into its opening position. Thus, the rotor and shaft 208 can now revolve freely and this action to free revolving occurs automatically at an engine failure. Provided naturally, as will be the case in forward flight, that no pressure acts in control flow port 235.

Figure 14:
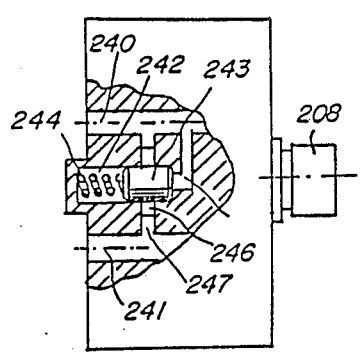
FIG. 14 is again a longitudinal sectional view through a further embodiment of the invention.

FIG. 14 demonstrates a further automatic overrunning effect in the motor of this figure. Housing 94 contains the motor arrangement and shaft 208 extends therefrom. Passage 240 is the exit passage while passage 241 is the entrance passage. Control piston 243 is moveable relative to chamber 242 and spring loaded from one end. Transfer passage 246 extends from exit port 240 through chamber 242 to entrance port 241. The piston 243 is shown in the figure in its closing location. Passage 245 extends from one end of chamber 242 into the exit port. Thus, when an engine or fluid flow supply fails or is shut off, their volume decreasing chambers of the exit half of the motor apply a pressure into the exit port 240 and thereby into passage 245 and into chamber 242 whereby control piston 243 is moved again spring force 244 into the opening location. Fluid can now freely pass from the exit half into the intake half of the working chambers of the motor. The action occurs automatically whenever an engine fails or the fluid supply is stopped by the pilot.

Figure 15:
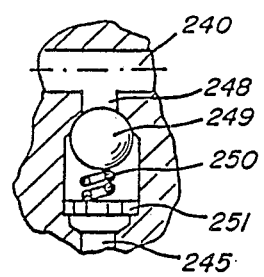
FIG. 15 is a modification corresponding to another arrangement associable to that of FIG. 14 and again it is shown in part.

FIG. 15 shows a safety arrangement. From one of the main ports of the motor to the other of the main ports or to a control chamber, for example 242, 222 or 232 of the former FIGS. 12 to 14 a passage 248 contains a spring loaded overflow valve 244. By spring 250, which may be kept by holder 251 the passage 248 is closed to prevent accidental opening at too low pressure in fluid line 240. Thereby valve member 249 acts as a safety brake. Higher pressure in fluid line 240, however, opens valve 249 to make a free flow from passage 248 into passage 245 and from there into the communicated passage or space possible.

Figure 16:
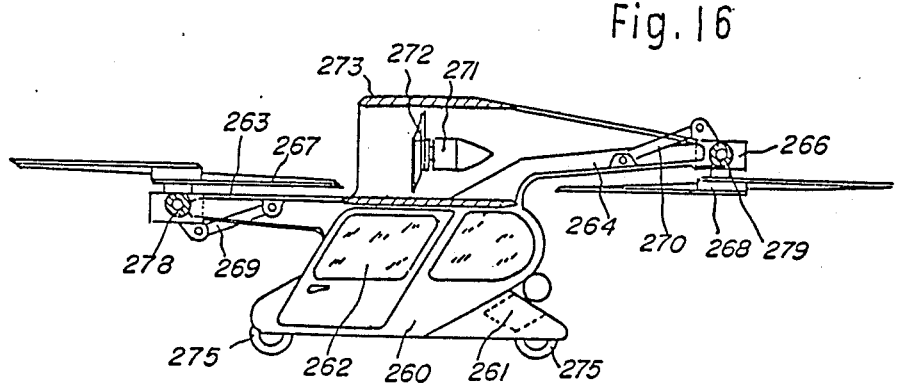
FIG. 16 shows an aircraft of the invention seen from the side.
Figure 17:
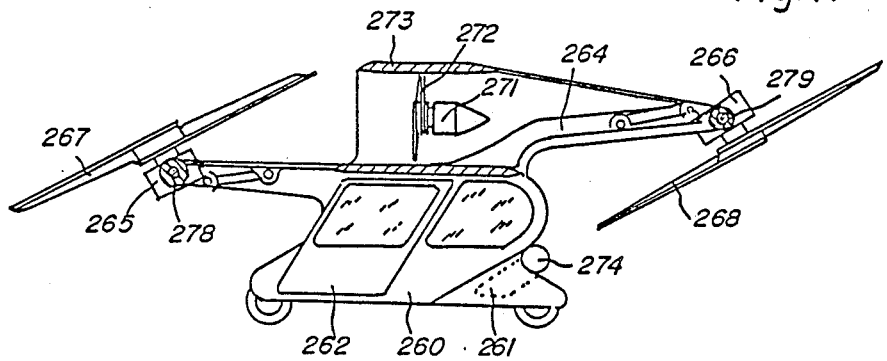
FIG. 17 shows the craft of FIG. 16 in a modified flight situation.

FIG. 16 and FIG. 17 show a gyrocopter or helicopter seen from the side, both in different flight conditions. Body-structure 260 may have ground engaging means 275 and fuel or fluid tanks 274 as well as a power plant with hydraulic fluid supply means and contain a passenger or freight cabin 262. Propeller holding arms 263 and 264 are attached to the body structure and said propeller holding arms or propeller-motor holding arms may contain the fluid lines to the motors or may be fluid pipes to the propeller motors, that the fluid lines or fluid pipes form the respective propeller holding arm. Motors, namely fluid motors, 265 and 266 are fastened to said propeller arms and each shaft of the motor may be associated to a propeller 267 or 268. A third propeller 272 may be associated to a third fluid motor 271 to supply the forward motion of the vehicle. Each of the said fluid motors is driven by fluid supplied through fluid lines from the fluid supply means on the vehicle. Fluid motors 265 and 266 may be fluid motors with overrunning one way means for enabling the propellers to continue to revolve when the fluid flow supply is stopped by the pilot or by an engine failure.

Thus, when the vehicle acts as a gyrocopter, all fluid flow power may be supplied to the fluid motor 271 for moving the vehicle forward. The bearing propellers 267 and 268 will then revolve as gyrocopter propellers in auto-rotation. For vertical take off, climb, descent or landing, all fluid power may be led to the main propellers 267 and 268 proportionately for effecting a safe climb or descent.

In FIG. 17 a further object of the invention is demonstrated. It shows that the fluid motors 265 and 266 are pivotably fastened onto the propeller bearing or holding arms 263 and/or 264. Inclination actuators 269 and/or 270 may be provided to effect the control of the inclination and the extension thereof. They may be remote controlled from the pilot cabin. By inclining the propellers forward the vehicle obtains forward flight and at same lift maintains lift or bearing lift for levelled flight. The angle of forward inclination defines the ratio of life-force to forward-force of the propellers and any desired ratio between these forces can be managed by the inclination controllers 269 and/or 270. In order to make a high inclination possible it is best to use a traction propeller 267 in the front portion of the vehicle, located above the propeller holding arm 263. But, on the contrary, the rear portion of the vehicle shows in the FIGS. 16 and 17 a pushing propeller 268 below the propeller arm 264, which is the rear arm to the rear portion of the craft for holding the rear propeller and fluid motor 266. By this arrangement the rear propeller can incline almost 90 degrees for fast forward flight, which would be difficult to obtain if the rear propeller would also be located above the propeller holding arm 264, because at high inclination it would move against this arm. Thus, the arrangement of FIGS. 16 and 17 with its novel rear holding arm prevents an otherwise heavy, extensive and expensive arrangement. The rear holding arm 264 may be associated to or contain a housing or duct 273 for holding or for holding therein the fluid motor 271 with forward motion propeller 272. Thus, a very harmonic and streamlined structure of a vehicle is obtained by these figures and the vehicle of these figures is capable of exactly vertical flight as well as of relatively high speed forward flight. At high speed forward flight all propellers may act together to apply forward thrust, or, if fluid flow to the lift motors 265 and 266 is stopped or appearing from engine failure, the propellers 267 and 268 may revolve in auto-rotation or in gyrocopter effect.

FIGS. 20 and 21 another embodiment of a vehicle of the invention is demonstrated. It shows, that it is now possible in accordance with this invention, to lift a substantially otherwise horizontally flying aircraft with wings straight vertically up into the air. Body 330 has the passenger cabin 332 and a power plant cabin or holder 344 which supplies the separated hydraulic fluid flows from the power-plants fluid flow supply means 344 to the fluid motors via respective fluid lines. In the front portion of the vehicle is a pivotable fluid motor 335 located which carries and drives a preferably larger diameter propeller 337. In FIG. 20 motor and propeller 335 and 337 are shown in the vertically working position. The horizontally tracting position of motor and propeller 335 and 337 is shown in FIG. 21. For inclined flight direction between vertical and horizontal flight any inclination therebetween can be steplessly variably set. The rear portion of the craft carries pivotably arranged elevators 345 which can pivot around pivot center 339. The elevators carry fluid motors 340 and 341 diametrically oppositionally located relative to the medial longitudinal face of body 330. Fluid motors 340 and 341 carry and drive preferably smaller diameter propellers 342 and 343. For vertical flight the elevators and thereby the motors and propellers are pivoted into vertical position as shown in FIG. 20. For forward flight they are pivoted into horizontal position for tracting the aircraft forward as shown in FIG. 21. Any desired inclination therebetween can be steplessly set if so desired. During high speed forward flight either the rear propellers or the front propeller can be adjusted by the remote controlled moveable members of the shafts of the respective motors into a 90 degree angle of attack position. Then they act as a streamlined body without traction, but also without major resistance in air. The whole power of the craft can then be sent to that propeller or to those propellers which shall drive the vehicle economically forward. The fluid lines to the fluid motors and the return fluid lines from them are inside of the craft and therefore invisible in the drawings. The body may have a retractable ground supporting member 334 and the elevators can, if desired, be the rear ground engaging support. A specific feature of the arrangement is, that all propellers at vertical flight are so remote from the wings that they do not blow air flow over the wings. Downward tracting airflow on the wings is thereby prevented and an economic vertical flight can be materialized. Instead of setting the rear motors and propeller onto pivotable elevators they might be set on separated holders behind the wings or on any other suitable location. Instead of using a single front motor and propeller a plurality of motors and propellers might be set and respective modifications might be done on the rear portion as long as the gist of the invention, to materialize on economically vertically and horizontally flying winged aircraft is maintained in accordance with the invention.

FIG. 22 is a longitudinal sectional view through another embodiment of a fluid motor of the invention. In particular it illustrates how a pivotable motor can be obtained and how the pivotable fluid motor is pivotably borne in a holding means. Holders 350 and 351 have with each other matching bearing borne of equal axes, wherein the swingable bearing portions 354 and 355 of the fluid motor housing are tightly fitting pivotably borne. Holder member 350 has the fluid line 352 wherefrom the fluid flows through fluid line 358 in bearing portion 354 354 and through passages 362 in housing 367 to the rotor in actuator 361 of the fluid motor. The fluid motor could be of any structure of my known or other fluid motors. However for a simple understanding the fluid motor of my patent 3,858,486 is demonstrated by actuator member 361 in order to show the both ends fluid flow supply and exit to and from the rotor. The latter is, as known, within the actuator ring 361. The exit fluid passages 364 are provided through housing 367 to extend to fluid passage 357 in bearing portion 355 and from there the exit fluid flows through passage 353 in holder 351 back to the tank or pump. For opposite revolution of the shaft 360 of the motor the direction of flow can be reversed. Propeller 365 may be fastened by a flange and holding means 366 to shaft 360. Shaft and rotor are borne in bearings, which are shown in the figure without referential numbers, because the action of a bearing of common use is generally known. Also generally known are seal means like O-rings, which are also shown in the figure but which have no referential numbers for the same reason. For convenience of friction free pivoting or swinging the annular grooves 356 and 357 may be provided in holding members 350 and 351 for giving equal pressure from the whole 360 degrees radially to the respective bearing portions 354 and 355 at that area, where the flows pass from the passages 352 and 353 into the passages 358 and 357 in the bearing portions of the fluid motor. For setting one end or radial supply motors the fluid passages are correspondingly modified within the scope of this invention.

In FIG. 23 another pivotable supported fluid motor is shown. This motor can be of any known type. It must, however, be provided with bearing portions 373 and 372 of cylindrical configuration or any other suitable configuration to be borne in holder members 370 and 371. Thus, motor 374 can pivot or swing around axis 510 and motor 367 can swing around axis 511 or pivot therearound. Flange 375 can be fastened to the shaft of motor 374 by respective bolts, rivets or fasteners 376. The bearing portions 373 and 372 of the fluid motor of this figure have no fluid line passages. Therefore flexible fluid pressure hoses are set to the entrance and exit ports on the end of the motor 374 or onto the housing thereof. Without these flexible fluid pressure hoses the motor would not be able to pivot or swing around the axis 511 during operation under fluid pressure supply and return flow of fluid. If so desired, fluid pressure hose 378 may extend with the other end to a passage in holder member 371. Fluid pressure hose 377 is shown to extend freely in order to indicate that it may be set to any fluid pressure passage at any suitable place.

In FIG. 18 the aircraft has a body 81 carries a main fluid motor 89, which in turn carries a main rotor 82, a side-control means 86 and a rear portion 85 as well as a power plant 90, a pump 91 and fluid lines.

Power plant 90 drives pump 91. From pump 91 one pressure delivery fluid line 93 extends to fluid motor 87 to drive the same and the propeller 83 driven by said motor. Another fluid pressure delivery line 94 extends also from pump 90, but to fluid motor 88 to drive the same and thereby the propeller 84, which is fastened to the rotary shaft of fluid motor 88. The fluid returns with less pressure from the motors 87 and 88 through the return fluid line 95 directly or indirectly to the pump 91.

In FIGS. 19 and 24 the arrangement of the rear portion 85 with the fluid motors and propellers thereon is similar to that of FIG. 18 as above described. In FIG. 19 pump 91 takes over the delivery of the flows 93,94, of pump 91 of FIG. 18. Power plant 90 drives pump 91 in FIG. 24 and power plant 90 drives pumps 92 and 91 in FIG. 19.

Delivery line 90-a leads fluid under pressure from pump 91 in FIG. 18 to main fluid motor 89 in the Figure and the return line 95-a returns the low pressure fluid to the pump 91. Main fluid motor 89 drives the main rotor or propeller 82.

In FIG. 19 the pump 92 is a multi-flow pump to supply four, six, eight or more flows of fluid under pressure to drive a corresponding number of fluid motors and propellers thereon. Shown in FIG. 18 are four fluid delivery pressure lines 92a to 92d, four main fluid motors 89a to 89d and four main rotors 82a to 82d. But instead of setting four motors and propellers it is often useful to set six or eight motors and propellers. Inventor prefers to set propeller-pairs, whereof each one propeller is on the right side of the body and the other propeller of the same pair is on the left side of body 81. Propellers of the same propeller-pair revolve with oppositional rotary direction. That is obtained by the respective port-connection of the respective fluid motors to the respective delivery fluid line. Fluid line 92a drives motor 89a and propeller 82a. Fluid line 92b drives motor 98b and propeller 82b. Fluid line 92c drives motor 89c and propeller 82c and fluid line 92d drives motor 89d and propeller 82d. The rate of flow of fluid in said delivery fluid lines 92a to d is equal in all of said fluid lines with previous numeral 92. The fluid is returned under little pressure from said fluid motors through return fluid lines 95a to d directly or indirectly to pump 92.

In FIG. 24 the pump 91 supplies an additional flow in addition to the flows 93 and 94 to the rear motors. This additional flow is fluid pressure flow 96 through fluid line 96 to main fluid motor 89. The fluid returns after use from motor 89 through fluid line 95 to pump 91. Fluid motor 89 is borne in holding members by motor arms 97, whereby the motor 89 can pivote with its axis between positions 89a to 89c. A twin fluid line 96a extends from high pressure fluid delivery fluid line 96 to a chamber 98. In chamber 98 a member 99 is reciprocably mounted and closes the chamber 98 in one direction. A spring means presses said member 99 towards the bottom of chamber 98. A connection member extends from member 99 to a connection portion 99b of the fluid motor 89.

The craft shown in FIG. 18 may either operate as a helicopter or it may operate as a gyrocopter. For example, when the main motor 89 drives the main rotor 82, the craft acts as a helicopter. Propellers 83 and 84 may drive the helicopter forward. When, however, the motor 89 is built as one or the other motors of this invention, the delivery of fluid from the pump 91 to the main motor 89 can be stopped. This may be done when the craft already has a forward motion of enough speed to allow either autorotation or gyrocopter-type rotation of main rotor 82. The propellers 83 and 84 will then continue to drive the craft forward, whereby the main rotor 82 maintains its revolutions as the rotor of a gyrocopter. The one way coupling means then overruns the small or no motion of the shaft of motor 89. Motor 89 may then come to a standstill. The flight of the craft may continue as gyrocopter. Motor 89 may be energized by supply of pressure fluid again for landing. It is left up to the pilot in this craft to fly either as gyrocopter without fluid power supplied to the main motor 89 and to propeller 82 or to fly the craft as helicopter with supply of drive fluid to main motor 89. If only one of both said systems of flying is wanted, the customer may order the craft of FIG. 18 for either helicopter-like or gyrocopter-like, whereby either the main motor 89 or the overrun-coupling may be spared.

The craft demonstrated in FIG. 19 may have similar motors 89a to d and propellers 82a to d, whereby each of said motors may be similar to the motor of FIG. 18. So may be the propellers. With the exception that the propellers of same propeller-pairs revolve in opposite direction.

Thus, the craft of FIG. 19 may so as the craft of FIG. 18 fly either as a helicopter or as a gyrocopter, depending, whether the rotors 82a to d are driven by the motors 89a to d or not.

The feature of the craft of FIG. 19 is in addition to the features of the craft of FIG. 18, that the craft of FIG. 19 can carry a very heavy load. Because, according to the "Handbook of my flight technology" of the inventor, a plurality of propellers of equal size can carry more load with the same amount of total power, than a single propeller can. It is true, that the hydraulic drive of the invention has some losses. But it is not true, that thereby the multiple propellers would carry less load at same power, than a single propeller of the same size, driven by equal power would, when the single propeller would be driven without transmission losses. It is true that the multiple propellers carry at same power more load than a single propeller, even when the multi-flow drive has losses. Only a helicopter with a single propeller will have a carrying capacity loss by the losses of a fluid drive. But not a multi-propeller arrangement, as in inventor's patents or patent-applications.

This appears from the following:

From Newtons law of force it is known, that mass multiplied by the acceleration gives the force, according to equation (1):

$$\text{Force} = \text{mass} \times \text{acceleration; or: } F = m \cdot a \quad (1)$$

The mass of air which flows through the propeller circle is:

$$m = G \cdot F \cdot V \quad (2)$$

And, since it is required to accelerate the mass of air when it flows through the propeller circle from the velocity "V" to the final velocity "V", the mass of air which flows through the propeller circle is:

$$a = V_2/\text{second} \quad (3)$$

Consequently, the force required by Newtons law is:

$$F_k = g \cdot F \cdot V_1 \cdot V_2/\text{sec} \quad (4)$$

And, since it is known from the "theorem of Freude" that the speed of the air through the propeller circle is the mean value of thge velocities of the air before and after the propeller, namely:

$$V_1 = (V_0 + V_2)/2 \quad (5)$$

the force, which is required to keep an air borne craft with vertical propeller axis (axes) in hovering without ascent or descent is:

$$F_k = gFV_1V_2 = gFV_12V_1 = gF2V_1^2 \quad (6)$$

or, with I=impuls, $$I = m2V_1 = 2gFV_1^2 = H = S \quad (7)$$

The impulse by a propeller to the fluid stream or the lift of the propeller with vertical axis at level is:

$$I = m2V_1 = 2gFV_1^2 \quad (7)$$

The kinetical energy in the airstream after the propeller is:

$$E_u = \frac{m}{2}(2V_1)^2 = 2sFV_1^3 = N \quad (8)$$

Equation (2) can be transformed to:

$$V_1 = \sqrt[3]{N/23F} \quad (9)$$

and thereafter I insert the "$V_1$" of equation (9) into equation (7) as follows:

$$I = S = H = 2_sF\left[\sqrt[3]{N/28F}\right]^2 \quad (10)$$

which may be transformed to:

$$I = S = H = 2_sF\sqrt[3]{N/28F}\sqrt[3]{N/28F} \quad (11)$$

or to:

$$S^3 = H^3 = I^3 = 8S^3F^3\frac{N}{2SF}\frac{N}{2SF} \quad (12)$$

or to:

$$S^3 = H^3 = I^3 = \frac{8}{4}SFN \quad (13)$$

or to:

$$S = H = \sqrt[3]{2SFN^2} \quad (14)$$

or to:

$$N = \sqrt{S^3/2SF} \quad (15)$$

In the above equations I use:
I = Impulse = Lift  H = Thrust  S = Kg.
V1 = airflow velocity in the propeller-circle, in m/s
m = mass of air grasped by the propeller in Kg/9,81.
F = cross-sectional area of the propeller-circle in m²
g = density or air = Kg s²/m⁴; and
N = Ek = power required in Kgm/s = kinetical energy.

I now introduce the efficiency "$\eta$" of the hydraulic drive. And I introduce the number of propellers "M" whereby all propellers have equal diameters and shapes, with the exception, that each 2 nd propeller of the same propeller pair revolves oppositionally.

With this knowledge I introduce the efficiency and the number of propellers into equation (9) and obtain:

$$S = H = M\sqrt[3]{2SF\left(\frac{\eta N}{M}\right)^2} \quad (16)$$

For equal power and equal size of propellers as explained above, in equal air, the values "2gFN" are equal and they can be taken out of equation (10). I now obtain equation (11), which reads as follows:

$$F_{TL} = M \sqrt[3]{\frac{\eta^2}{M^2}} \qquad (17)$$

and wherein "Ftl" is a comparision factor which directly gives a universal comparison of lifting capacity for numbers of equal propellers over the transmission efficiency. See FIG. 33.

Figure 33:
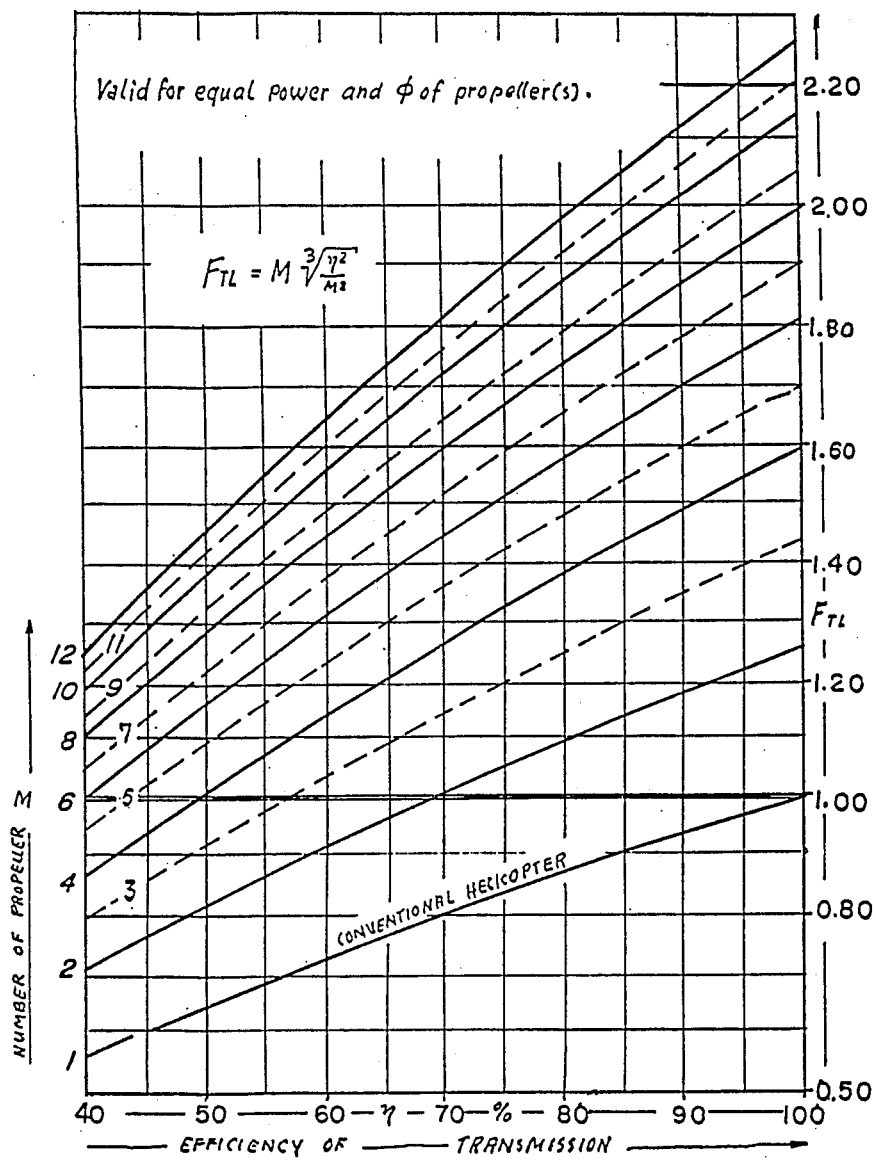
FIG. 33 shows a diagram of mathematical values or functions.

Therefrom it can be seen, that even with 20 to 30 percent of losses in the hydraulic drive system, the plurality of propellers of FIG. 19 lift up to 2 times more than a single propeller craft as that of FIG. 18 or as the conventional helicopter of equal power and propeller size. Equation (11) with factor "Ftl" is shown in FIG. 33. A craft with four Bensen gyrocopter propellers in FIG. 19 can carry about 2000 lbs gross and about 1100 lbs net.

And, FIG. 33 shows, that even much more economy can be obtained with more than 4 propellers. For example with eight propellers in four propeller-pairs the equal installation of power will carry almost twice as much as equal power would carry with a single propeller as in the conventional helicopter. Even when the fluid drive of the invention has several losses.

The feature of the craft of FIG. 24 is, that it may fly as a helicopter with high speed, but that in addition it will automatically bring the craft into gyro-copter-like operation or into auto-rotation, when the power supply to the main motor 89 would fail. Therefore a great safety of the craft is obtained because the pilot does not need any more to switch to auto-rotation when the said power supply fails. He will just continue to fly as gyrocopter or, in case of total power failure, just sink slowly down as a gyrocopter does, even when the pilot sleeps or does nothing at all.

This safety arrangement is obtained as follows: High pressure fluid from fluid line 96 through fluid twin line 96a presses fluid into chamber 98 and thereby presses member 99 upwards. Over connections 99a and 99b the main motor 89 pivots around holding axis 97 into axis position 89a which is the helicopter-flight position. When the fluid supply in line 96 fails, the spring means 99a forces the member 99 downward and thereby pivots the propeller axis either into position 89b or 89c, depending on the actual design. Position 89b is the auto-rotation position of the helicopter and position 89c is the gyrocopter-type flying position. Thus, fluid pressure automatically makes helicopter-flight position and fluid pressure failure automatically provides either auto-rotation landing or gyrocopter-like flight or landing.

Instead of waiting for the automatic action, it would also be possible to incorporate a manual control for switch between the described positions and principles of flying.

Figure 31:
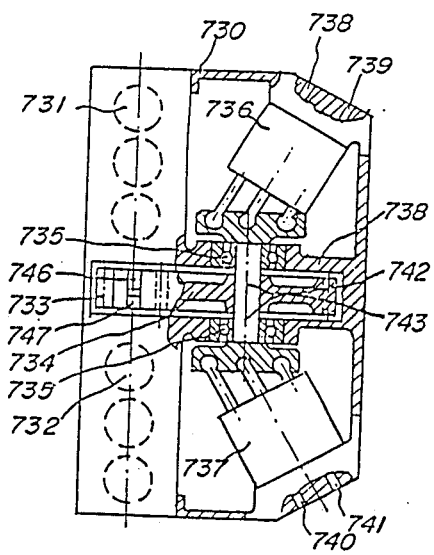
FIG. 31 is a sectional view through another embodiment of the invention.

In FIG. 31 another embodiment of the invention is demonstrated. It shows how a plurality of pumps can be effectively driven by an engine or a plurality of engines. The assembly of this figure eliminates friction in pumps and thereby increases the efficiency of the pumps. Because it balances the axial thrust, which is apparent in axial piston pumps or radial chamber pumps with thrusting control bodies on the opposite end of the rotor of the pumps. Thus, according to this embodiment of the invention, the shafts 742 and 743 are set head to head in order to balance their axial forces against each other. Said shafts may also form an integral shaft for two opposite located and directed pumps. Engine cylinders are shown by 731 and 732 and the gases in them drive a primary gear 733 which engages and drives a secondary gear 734. Instead of gears sometimes chains or other power transfer means are used. Pump shafts 742 and 743 are borne in bearings 735 in medial housing portion 738. Pumps 736 and 737 are located in housing 730 or attached thereto and they have in the known manner entrance and exit ports 738 to 741. Instead of one single engine a plurality of engines may engage to drive the primary gear means 733. For example two crankshafts 747 and 747 may engage into the common primary gear 733. The reaction forces of the primary gear may partially balance out the thrust of the pistons of the pumps onto the secondary gear 734 in FIG. 31.

Figure 32:
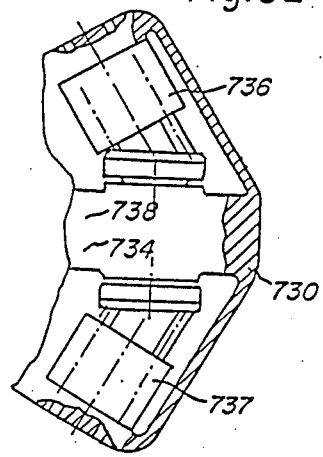
FIG. 32 is a view into a modified assembly of FIG. 31.

In FIG. 32 is demonstrated, that instead of gears 733 and 734 a chain drive may be used. In such case the secondary chain gear is subjected to traction towards the engine instead of the opposite reaction at gears 733 and 734. Therefore, in FIG. 32 the pumps are inclined in an opposite angle. The thrust of the pistons of pumps 736 and 737 acts now contrary to the direction of traction of the chain on the secondary chain gear. Thereby again some forces are balancing each other, so, that the remaining forces in the bearings 735 are again reduced, whereby the efficiency and power of the whole assembly increases. The main increase in efficiency and power is however due to the opposite thrust of the pistons of the pumps 736 and 736 onto the shafts 742 and 743. These forces are balanced by setting shaft head against shaft head, so, that the one shaft balances the oppositional directed forces of the other shaft. Since the shaft heads are relative to each other not moving, the balancing of forces appears in the embodiment of the invention without any losses. Consequently, the increase in efficiency and in power due to the embodiment of the invention is very considerable and the life time of the bearings is also increased.

Figure 38:
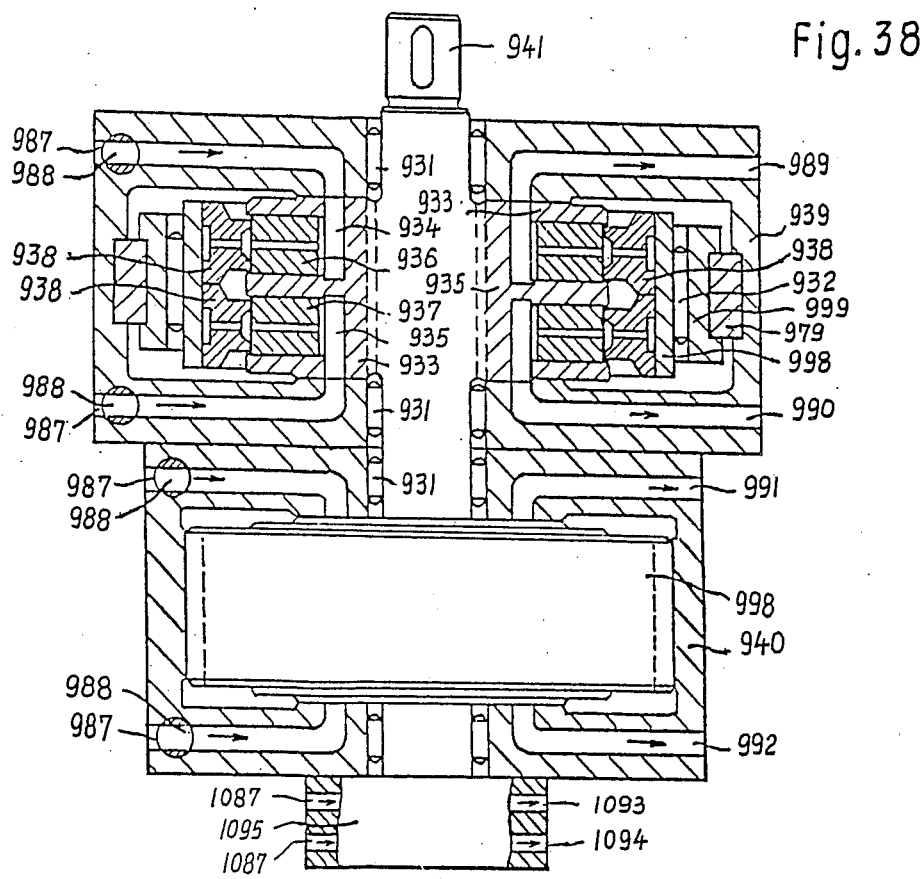
FIG. 38 is a sectional view through a pump means of the invention.
Figure 39:
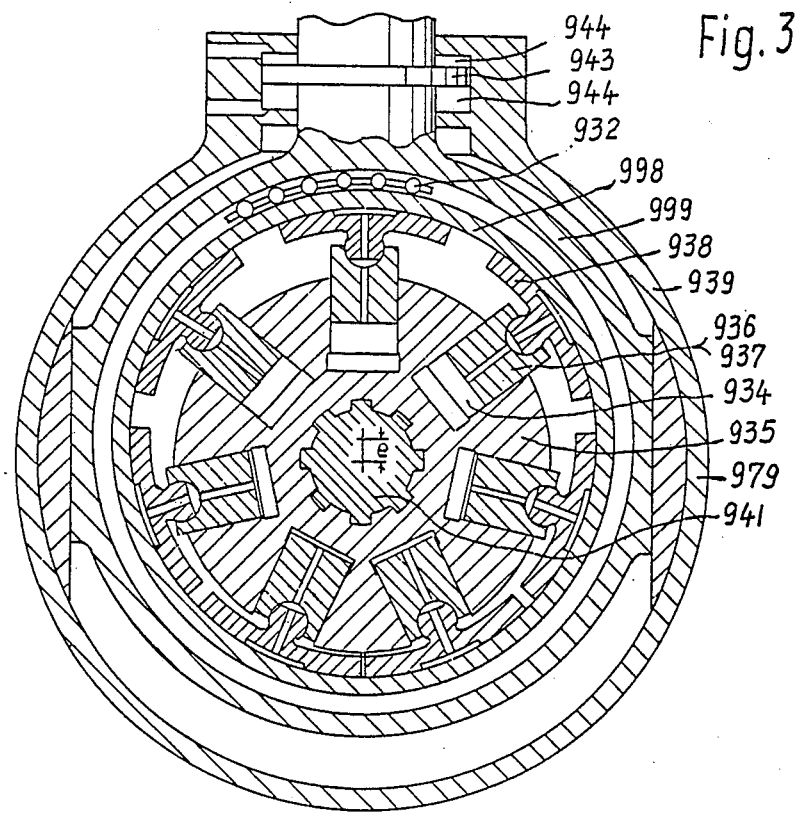
FIG. 39 is a sectional view through FIG. 38 along the line XXXIX—XXXIX.

In FIGS. 38 and 39, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 939 and 940 are flanged to each other, and the shaft 941 carrying the rotors is rotatably mounted in bearings 931 provided in both of the housings. Each of the housings encloses one rotor 933, and each rotor 933 is formed with two groups of delivery chambers or cylinders 934 and 935 in which pistons 936 and 937 are reciprocated by means of a reaction ring 998 with interposed piston shoes 938. Body portions 1333 of the rotor or fluid handling body 933 remain uninterrupted between two neighboring working chamber groups 934 and 935 for the separation of the respective working chamber groups 934 and 935 from each other. A stroke adjustment slide block 999 surrounding the reaction ring 998 with an interposed bearing 932 is displaceable, within certain limts, along guides 979, whereby the stroke of the pistons may be varied to a limited extent. Each of the mentioned rotors 933 has a medial uninterrupted portion 1333 between the respective two neighboring working chamber groups 934 and 935 for the separation of the respective working chamber groups from each other. Thereby the groups of cylinders 934 and 935 are completely separated from each other, and each group has its own fluid inlet passage 987 and fluid outlet passage 989 to 992 respectively. The pressure fluid inlet and outlet passages cannot communicate with each other. Flow volume regulators 988 may be mounted in the inlet passages in case that the stroke adjusting slide block 979, 999 is not provided. The other housing 940 encloses the same members, i.e., the rotor block with groups of cylinders, pistons, piston shoes, and only the reaction ring 998 is not adjustable. In the figure, this reaction ring 998 is shown in an elevational view. The part mounted in the housing 940 has its own inlet passages 987, if necessary, with flow regulators 988 mounted therein and two mutually separated and non-communicating fluid outlet passages 991 and 992. A priming device 1095 having inlets 1087 and two separate outlets 1093 and 1094 may be provided at the end of the pump. In this case, the outlets 1093 and 1094 lead to the inlets of the main pump. The outlet passages 990, 991 and 992 are connected each to one of the hydraulic motors of the vehicle through pressure fluid lines. Owing to this arrangement, a fixed proportionality, in particular equality, of the rates of flow in all of the four circuits is assured, with two of the flows being jointly adjustable.

FIG. 44 demonstrates in a schematic the generally known appearances in a fluid stream, when it flows through a propeller circle. The Figure is provided as a basis for the equations (1) to (11). The propeller-circle is shown by 176 and 170 is the substantial vertical axis of the propeller with the air at "V" above the propeller in rest. The propeller accelerates the air downwards through the propeller circle, whereby the air in the airstream reaches finally an end behind the propeller the velocity "V2". In the propeller circle the velocity downwards is ½ of V2, namely "V1", whereby "V2" becomes 2 "V1". The curved arrows illustrate the fluid flowing downwards through the propeller circle. The value: "V1"=½"V2" is known as the theorem of Freude.

Figure 8:
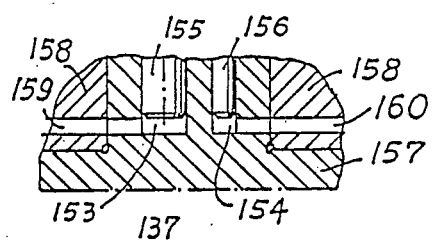
FIG. 8 is a sectional view throug a portion of a pressure transmission of the invention.

FIG. 8, which demonstrates a longitudinal sectional view through a portion of pressure transmission has a rotor 157 revolvingly borne in a housing 158. It has at least two working chambers 153 and 154, whereto displacement members 155 and 156 may be added. It has further the passages 159 and 160 to and from the rspective chamber 153 or 154. In the Figure, the chambers are chamber groups 153 and 154 with the chambers being cylinders with pistons 155 or 156 respectively therein. In the embodiment of the pressure transmission of the Figure, the cylinders 153 with pistons 155 have larger cross-sectional areas than the cylinders and pistons 154, 156. Letting now pressure fluid flow through passage 159 into the respective cylinder(s) 153, the left part of the transmission is actiong as a fluid motor, while at the same time the right side is acting as a pump, driven by the said fluidmotor 151, 156. Fluid is then supplied by pistons 156 in cylinders 154 out of outlet 160. Naturally, there must be piston guide means for guiding the stroke be applied in the transmission, but that is immaterial in the figure, because it is known from the other pumps and motors which are shown.

The purpose of the transmission is to set it into a fluid line which is existing in the vehicle. The transmission will then supply a fluid under a higher pressure than that in the fluid line communicated out of outlet 160. Or it will supply a fluid flow under lower pressure than the communicated fluid flow, when the fluid flow of the vehicle would be set onto port 160, whereby port 160 would become an entrance port, 154 the motor and 163 the pump. Port 159 would then become an outlet port and would supply a flow with greater rate of flow but lower pressure.

The so obtainable higher pressure may be used, for example, in the chambers 73 of FIGS. 1A or also in the chambers 110 of FIG. 7; 71 of FIG. 1, fluid lines 5 or 4 or 14 of FIG. 1, line 16 of FIG. 2, 220 of FIG. 11, cylinders 270 of FIG. 16, 17; as well as at other occasions.

In FIG. 43 is a portion of a pump demonstrated in a longitudinal sectional view.

It shows: A hydrostatic pump in combination with a novel arrangement; wherein the common pump includes a rotor 123 revolvingly borne in a housing 137 and a number of passages 133, 134, 127 from parts 196, 124, 149 to chambers of working chamber groups 88, 188 with displacement means 91 provided to said working chamber groups for transferring a flow of fluid through each of said working chamber groups individually and separately of others of the flows over control ports in a control body 95, 195, 126 into the respective working chamber groups when the respective chambers expand and out of said workin chamber groups when said chambers contract, whereby the outflows from said chambers flow through other passages over said control bodies through other ports, which form outlets thereby, while the number of said groups, flows and outlets are equal in number consisting of a plurality of groups, flows and outlets which are defined by the adjectives of the digetial numbers from first to "n-th" with "n" being the total number of said flows, groups and outlets; and the said novel arrangement defines a pump, wherein the first of said flows is an axial flow from one axially outer first chamber group 88 through a first axially of said rotor 123 located control body 95 out through a first outlet 196;

wherein the second of said flows is also an axial flow, but of the opposite side of said pump and flowing from an outer second chamber group 88 through a second oppositely axially of said rotor 123 located control body 195 out through a second outlet 124;

wherein at least one more of said flows might flow out of at least one more chamber group and through a respective control body out of a respective outlet;

wherein a n-th flow of said flows flows as a radial flow out of a respective medial chamber group 188 through a respective control body 126 and out through an n-th outlet 149;

wherein the rates of flow of said flows are proportionate relative to each other and said flows are separated flows which are individually separated from others of said flows and not communicating with other of said flows; and, wherein one of said control bodies 126 is located in a hub of said rotor 123 and sealing along the inner face of said rotor which forms said hub, while said rotor is provided with a shaft 135 which extends axially out of said housing 137.

In FIGS. 4 to 6 the respective fluid motor is shown from outside in a view onto it and so are the respective shaft 8, 118 and the respective holder arrangement 32. Shown are the same motor, holder and shaft in all three of the Figures. In each of the Figures a propeller-blade is shown in a cross-sectional veiw and seen by referential 33. In all three figures the propellers have different angles of attack relative to the top face of the motor 94. When the axes of the motors and propellers are vertical as shown in the figures, the angles of attack would be the angles between the propeller blade face through the tips on front and rear of the blade and the horizontal surface of the earth. FIG. 4 shows the propeller blade 33 to have an angle 138 relative to the top surface of the motor. FIG. 5 shows a respective angle 139 of blade 33 and FIG. 6 shows an angle 140 of propeller blade 33.

Assuming now, that the respective control flow port 14, 16 220, 114 of the motor 94, when motor 94 would be that of FIG. 1, 2, 7 or 11, would be communicated to the respective motor driving main-flow fluid supply and delivery pressure fluid line and the spring means in the respective shaft assembly of the motor be set to permit at the maximum of pressure in said delivery line the angle 138 of FIG. 4 for propeller blade 33 and in case of no pressure in said delivery fluid line, which would drive said motor when it had pressure, the sring assembly associated to the shaft or propeller would set the propeller blade to the angle 140 of FIG. 6, the following might be obtained:

(a) When the craft is at rest with the engines not working, the blade 33 will have the angle of inclination 140.

(b) When the power plant works with full power it supplyies the maximally possible quantity of rate of flow and of pressure, the angle of inclination would through the embodiments of the invention be automatically set to inclination 138 of FIG. 4 and the blades 33 would revolve with the fastest speed. The craft would lift vertically upwards with the velocity of air flowing through the propeller circle of blades 33 becoming V1 equal to the flow-arrows 141 in the left portion of FIG. 4. The blades 33 would run in downwards moved air with a relative downspeed added at each swing being "Vrv" as shown in the middle of FIG. 4.

(c) When the vehicle would fly therafter with the forward speed "Vo" as shown in the left portion of FIG. 5, the airflow would flow in an inclined direction through the propeller circle, as shown in the left portion of FIG. 4 whereby the radial downward component would be shorter than in FIG. 4. The relative added downspeed adeed at each swing "Vrv" —see middle of FIG. 5—would be very roughly equal to that of FIG. 4. The shorter downward component in FIG. 5, left portion, is possible, because the craft is now moving through air and not required any more to tract all air from above onto the propeller. That results in a smaller requirement of power and as a result thereof, at reducing the power of the power plants, the pressure in the supply fluid line drops and it drops also in the assembly set onto the motor, whereby the spring therein reduces the angle of inclination to angle 139 in FIG. 5 right portion. This angle 139 is now smaller than angle 138 in FIG. 4. The craft can now fly comfortably with smaller or reduced power consumption. Assume now that in such flight an engine fails or a fluid line breakes When that happens, the pressure in the motor driving fluid supply line drops to practically "zero", the rotor of the motor comes to rest and the motor can not fulfill its duty any more. The pressure drops also in the respective control cylinder 110, 213, 37 of FIGS. 7, 2, 11, whereby the spring means 238, 72 or 116 therein are automatically pressing the angle of inclination down to angle 140 fo FIG. 6. While the angles 138 and 139 of blades 33 are shown positive upwards in FIGS. 4 and 5, the respective angle 140 shows negatively downward in FIG. 6.

As a consequence thereof, the craft starts to descent, because the rotor blades 33 are slowly losing speed in rotary direction. During descent of the craft, the air flows upwards as shown by 143 in the left of FIG. 6, providing an upwards directed "Vrv" in the middle of FIG. 6 and while the air flows upwards against the negatively inclined blade 33, the air is starting to drive the blades 33 in the rotary direction of arrow "Va" with the rotary speed "Va". Since the rotor of the motor came to rest, the rotary speed of the blades 33 over-runs by the presence of the one-way or free wheeling arrangement on the motor the rotary speed of the rotor of the motor. This rotary velocity "Va" which the propeller blades obtain automatically by the invention, when the craft descends without engine power available, will be called the auto-rotation velocity "Va" and is shown by the arrow on top of FIG. 6 right portion.

The forward rotary velocity "Va" which the rotor blades obtained automatically and without any control action by a pilot and as described above, is the "autorotation" of the rotor blades 33. In this invention it is an "automatic auto-rotation" because no control or other maneuver or handling of a pilot is required. The auto-rotation of the invention is thereby a specially saft auto-rotation because no pilot error is possible, because the auto-rotation develops itself without the pilot's help.

When the auto-rotation velocity "Va" is obtained, the high rotary speed of the propeller blades are developing a lift. This lift is created by the airfoil section of the wing. in this case by the airfoil section of the propeller blades 33. The mentioned lift is slowing down the speed of the descent of the craft, whereby the craft may come to a safe emergency landing on the ground. It should be understood, that the negative angle 140 is exaggerated in FIG. 6. In practice it may be smaller. Since the rotors of the motors may not come immediately to rest or at least the moment of inertia of the mass of the rotor propeller blades 33 prevents their fast stopping, there will be a gradual change from powered drive to auto-rotation and thereby to a parchute-like descent of the craft.

While the action of the obtaining of automatic auto-rotation has been described above at hand of some of the figures of the invention, it may be appreciated, that others of the Figures or other combinations of the Figures may obatin a similar auto-rotation effect.

The pressure transmission of FIG. 8 may also be utilized to be set into a fluid line or fluid lines to a rear motor or rear motors of the craft. Thereby the angle of inclination may lift over the angle 138 of FIG. 4. The propeller blades 33 of the rear motor or motors of the craft would then have a still bigger positive angle than that of 138 in FIG. 4. Such higher angle of inclination of the rear blades 33 would then lift the craft in the rear portion slightly higher than the front portion of the airborne craft. As a result thereof the axes of the propellers will incline slightly forwardly and the craft will then fly automatically forward with a predetermined forward speed "Vo" without the help of a pilot. Closure devices for pilot or radar control may be set to the respective pressure transmission to stop the automatic forward flight of the craft. Since no fluid is leaving the respective cylinder 110 etc., in the automatic propeller angle inclination arrangement, the respective pressure transmission of FIG. 45 can be a very small one with almost no power consumption in application in the described manner.

Figure 41:
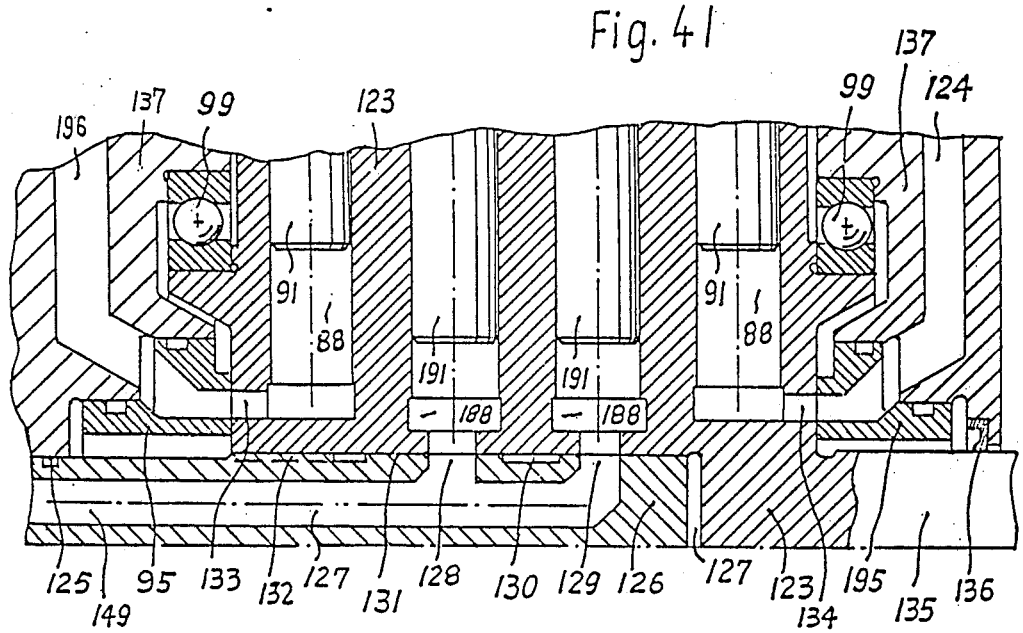
FIG. 41 is a longitudinal sectional view through a portion of a multiflow pump of the invention which may be employed in a vehicle of the invention.

It is very convenient and of great importance of safety to combine, for example, the four rotors of FIG. 19, namely the vertically acting rotors 82a to 82d of FIG. 19 or the six rotors of FIG. 41 with a pump of FIG. 39 or a double pump set of FIG. 41 with separated delivery fluid lines to the application of motors as described at hand of the description of FIGS. 4 to 6, for example, motors of the type of FIG. 7 with the outer end arrangements of FIGS. 2 or 11.

If that is done, a vehicle is obtained, which combines, in combination, an automatic propeller rotary speed synchronization to all of the lifting propellers with an automatic synchronization of the start and actuation of the auto-rotation of all lifting propellers in case of power plant- or fluid flow supply-failure during flight.

The craft remains stable and upright in the air without spinning around the vertical axis of the vehicle, because the vehicle has not tail-rotor and all lifting rotors are diametrically located relative to the vertical axis of the vehicle, while at the same time diametrically located liting propellers are revolving with oppositional rotary directions.

Since the automatic autorotation and the synchronization of the start thereof need no pilot's help, the vehicle can descend as hanging on a parchute to the ground without the pilot's help. The fluid flow drive system of the invention has in case of this embodiment of the invention become a driving and propeller-speed synchronization system in combination with a fluid drive system for the automatic and synchronized actuation of the auto-rotation for emergency occurances.

Figure 40:
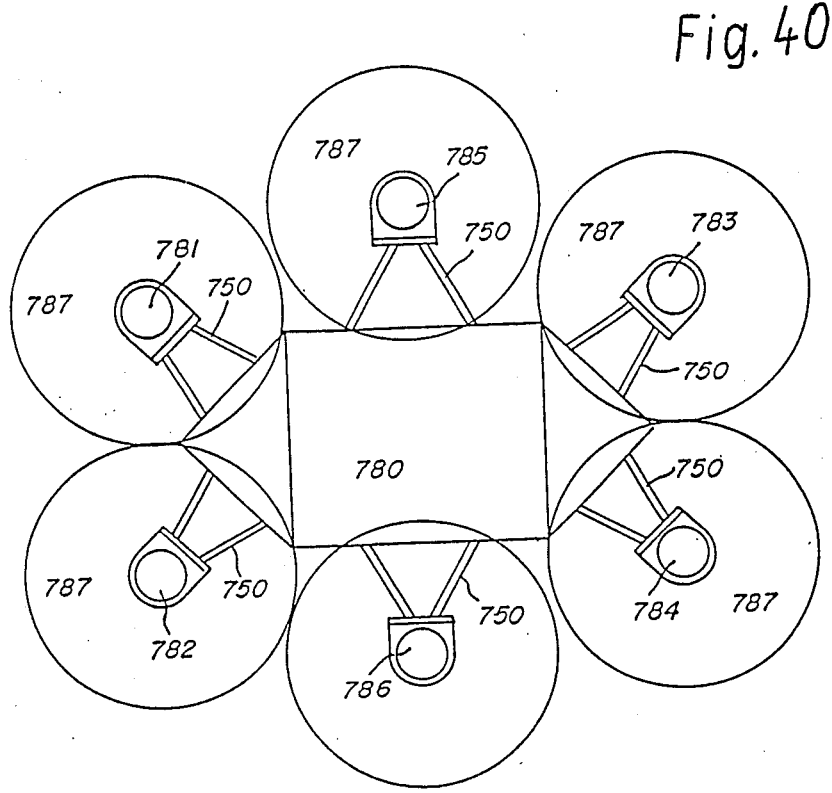
FIG. 40 is a view from above onto another vehicle of the invention.

To drive the six propellers of the craft of FIG. 40 two three flow sets of the pump of FIG. 41 may be connected, for example, over gears to the respective power plant to be driven thereby with equal speed for the supply of six flows of equal or proportionate rate of flow. For eight propellered vehicles two sets of pumps of FIG. 39 may be similarily used. Also the four flow pump of FIG. 19 of may Pat. 4,171,784 or the motors of my Pat. 3,977,302 may be used. They also have releasable couplings between rotor and shaft of the motor. The motors of my patent 3,977,302 were content of my earlier patent application 05-954,555, but have now been cancelled in this present application, because it can now be referred to them by reference to Pat. 3,977,302.

In practical application it is preferred to use at least two independent power plants with "n" separated flows each in the craft and to set one-way check valves into the delivery pressure lines. Thereby each one pressure delivery fluid line from one of the power plants can be combined after the check valves to a common fluid line to the respective motor. For example the first flow of the first power plant to be combined with the first flow of the second power plant to lead a common delivery line to the first motor and propeller of the craft. Then to combine the second fluid line of the first power plant with the second flow of the second power plant to a second common pressure delivery line to the second motor of the craft and so on, until the "nth" flow of the first power plant is combined with the "nth" flow of the second power plant to a common "nth" pressure deliver line to the "nth" motor of the airborne craft.

Since such craft utilizes many hydrostatic fluid lines and hydrostatic components, which would have similar names in basic technologies or at education in schools, it is now preferred to give different terms to components with different functions. The fluid flows, which drive the rotors of the motors may thereby be called "Drive flows", the fluid in the fluid connections to the propeller pitch control arrangements may be called the "thrust fluid"; the revolvable members, which are holding the roots of the pivotable propeller blades may be called "root holding heads", the linkages between the respective arrangement of a thrust chamber and a counteracting spring means may be called together with the mentioned thrust chamber and spring the "pivot-gear" and the ports of the control flows to the mentioned thrust chambers may be called the "thrust fluid ports".

In detail, for example, in FIG. 1, the following parts may be understood as follows: Port 97 as outlet; passage body 1 as thrust fluid passage body; control fluid passage 16 as thrust fluid passage; piston 82 as thrust body; chamber 73 as thrust fluid chamber or thrust chamber and control passage port 14 as thrust fluid port. Similarily the following parts may be understood as follows: In FIG. 2; the bearing portion 33 as root of a propeller blade; control fluid passage 16 as thrust fluid passage, member 36 as thrust body, chamber 37 as thrust chamber; housing 35 plus nut 38 plus bush 138 plus transmission member 41 plus bearing portion 42, plus connection member 39 plus bearing portion 43 are forming the "linkage". the thrust fluid plus the thrust fluid passage body 1, the thrust fluid passage 16, the thrust chamber 37, the thrust body 36; the housing 35, the nut 38, the bush 138, the transmission member 41, the bearing portion 42, the connection member 39, the bearing portion 43, the holders 32 and the propeller roots 33 are forming together the pivot gear and the holders 34 are forming the root holding head. In FIG. 7, the bore 111 may be understood as thrust fluid bore; cylinder 110 as thrust chamber; piston 114 as thrust body; seal portion 104 as thrust fluid seal portion; and control flow port 114 as thrust flow port. In FIG. 11 the passage body 101 may be understood as thrust fluid passage body; passage 220 as thrust fluid passage, pressure chamber 213 as thrust chamber; piston 214 as thrust body and the pivotable members 216 as roots of propellers, while holding members 212 may be understood as holders and the entire part 212 as the root holding head.

It may also be understood, that FIG. 3 forms a portion of FIG. 1, since the arrangement of FIG. 2 may be assembled anto the shaft 8 of FIG. 1. Since the drawing did not provide enaugh space to write the parts demonstrated in FIG. 2 onto FIG. 1, the FIG. 1 is shown separated and FIG. 2 is shown on the other sheet of the drawing. Since FIG. 2 thereby might belong to FIG. 1, the FIG. 3 which is a sectional view of a portion of FIG. 2 belongs also to FIG. 1.

In this connection it will be seen, that the arrester arrangement of referentials 26, 71, 72, 173, of FIG. 1-A which belongs to FIG. 1, together with the referentials 21 and 74 of FIG. 1 are useful to arrest the propellers of FIG. 2 from revolving, when a vehicle employsing such propellers 33 is parked. The start of the power plant and the start of supply of pressure fluid will then dis-arrest the propellers and permit the root holding head to start revolving together with the propellers. The arresting of the propellers of parked vehicles from rotation is important, since strong winds might start the rotation of propellers of parked vehicles and cause accidents to the public.

The embodiment of a vehicle of the invention, which combines the fluid power gearing and synchronization of the propeller speeds with the synchronization of the start of auto-rotation may also be defined as follows:

A vehicle for travel and rest in air with a capablity for substantially vertical take off and landing comprising a body with at least one pair of propellers with substantially vertical axes whereof one propeller of the respective propeller pair is located at a first location of a distance from the substantial vertical imaginary axis of the vehicle and the other propeller of the same propeller pair is located symmetrically opposite relative to said vertical axis of said vehicle at a second location of an equal distance from said vertical axis of said vehicle, whereby said vehicle includes a number of "n" propellers; at least one power plant which operates the creation of a plurality of "n" individual drive flows of fluid under pressure and relative to each other proportionate rates of flow in individual working chamber groups of pluralities of individual working chambers in respective fluid flow creating body-portions communicating separately and independently the said "n" chamber groups to "n" individual and from each other separated outlets;

a plurality of "n" individual and from each other separated, said drive flows leading pressure fluid delivery supply lines communicating said "n" outlets individually and separatedly of each other to a plurality of "n" entrance ports of "n" fluid motors to enter into and flow through the respective rotors of said motors to drive said rotors of said motors and to flow of respective exit ports of said motors to flow through respective return fluid lines at least indirectly back to said working chamber groups;

while said "n" motors are providing a plurality of "n" individual root holding heads and a plurality of "n" individual pivot gears which include a plurality of "n" thrust fluid ports, control fluid passages, thrust-chambers and counter acting spring means adapted to thrust bodies which are moveably provided in said thrust chambers in said pivot gears and a plurality of "n" one-way clutch means which permit the releasing of said root holding heads from said rotors of said motors and thereby the overrunning said root holding heads with a faster rotary velocity over a slower rotary velocity of said rotors of said motors;

each of said propellers is consisting of at least two propeller blades with each of said blades having a root located and pivotably borne in a respective individual holding portion of the respective root holding head with a respective linkage connecting the respective root of said roots with the respective thrust body of said thrust bodies of said pivot gears;

wherein said drive flows are forcing said motors and propellers to revolve at all times of powerd drive of said propellers with to each other proportionate rotary velocities, whereby said drive flows are forming an automatic rotary velocity synchronization device for said propellers of said vehicle, wherein said "n" delivery fluid lines are communicated individually and separately of each other to said "n" thrust fluid ports whereby the pressures in fluid in the respective drive flows enter into the respective thrust chambers in the respective pivot gear of said pivot gears to act against the respective thrust body in the respective thrust chamber and against the respective spring of the respective thrust body to set and define over the respective linkage of the respective pivot gear the inclination which defines the agle of attack of the respective propeller blades of the respective propeller of said propellers;

whereby a drop in pressure in the fluid in the drive flows is reducing by the thrusting force of said springs the angle of attack and the inclination of said propeller blades of said propellers, while said reducing of said inclinations of said blades of said propellers is synchronized to occur proportionate relative to each other at all of said propeller blades provided in said vehicle at equal times when at least one of said power plants fails to supply its desired rate of power;

and, wherein, when all of said power plants are failing and thereby the flow of said drive flows stops, said spring means in said pivot gears are forcing said blades of said propellers into an inclination suitable for auto-rotation by over-running the rotary velocities of said rotors of said motors by a faster rotary velocity of said propellers;

whereby said inclination suitable for auto-rotation of said blades creates and drives said faster rotary velocity of said propellers when said vehicle descends and in turn and consequence of said faster rotary velocity said blades of said propellers are creating lifts which slow down the rate of descent of said vehicle to a rate of descending speed which prevents a fatal crash of said vehicle; and, whereby said fluid in said lines of said vehicle thereby combines the synchronization of the rotary speeds of said propellers with the synchronization of said reducing of inclinations of said blades of said propellers and of said auto-rotation of said propellers.

The fluid motors shown in the Figures and in the invention, may become in short terms described also as follows:

A fluid motor has working chambers which take in and expel a fluid. The fluid under pressure acts in working chambers to produce a torque and thereby to drive the motor, constituting with the associated parts the drive means of the motor.

At least one separated fluid line supplies fluid into a space which includes or operates an additional member provided on the fluid motor. The mentioned fluid line and space are able to operate independently of the drive system of the motor.

It is, therefore, possible to operate over the fluid line, for example by remote control, the additional member on the motor independently of the fluid flow of the drive means of the motor. The additional member is therefore able to do an additional work or function independently of the drive means of the motor.

In other embodiments of the invention, the additional member may work in unison or dependence on the fluid drive of the motor, when so desired. Instead of applying only a single separated fluid line a number of separated fluid lines can also be applied and may provide different actions of one or more additional members on the fluid motor.

But the invention or the motors thereof may also be described in other terms of language. For example:

The invention has so far been described in commonly understandable terms of language.

For a compact definition of the inventive matter residing in the respective embodiments of the invention, it is, however, also possible to use different terms of language in order to define more clearly the different parts of the same embodiment.

The content of the respective embodiments may thereby also be described as follows by way of example:

The shortest definition of the invention is:

A vehicle including a power plant 261, 302, 344, 730, 402, 90, to operate a fluid flow creating arrangement for the supply of at least one flow of pressurized fluid to a hydrostatic fluid motor, and in said fluid motor a housing 94, revolvingly mounting a rotor 9, 108, 209, containing working chambers 88, for the reception of pressurized fluid, displacement means 91 to 93 for the transfer of force of fluid to a portion of the rotor to revolve the rotor; a control body 95, 195, 126, associated to the rotor and to the housing to control the flow of a driving fluid from inlets and outlets on the housing to and from the working chambers of the rotor; and a revolvable shaft 8, 118, 205, 203, 202 to be driven by said rotor;
- wherein said rotor includes at least one interior space 71, 505, 151, in addition to said working chambers; and;
- wherein said motor contains in addition to said rotor, said shaft and said control body for the control of said driving fluid at least one independly operable member 1, 36, 72, 118, 113, 208, 214, 216, 212, 204, 209, which is at least partially operable independently of adaption to pressure in said driving fluid which flows through said working chambers of said motor.

Further short definitions of details of the invention are:

The vehicle of the above,
- wherein pluralities of said motors and propellers are provided as pairs, which one motor and propeller of each pair symmetrically to the other propeller of the same pair respective to a centre of said vehicle.

or; The vehicle of above;
- wherein said vehicle employs at least two pairs of said motors and of said propeller with said substantially vertical axes.

or: The vehicle of above;
- wherein said vehicle employs at least one pair of said propellers with said substantially horizontal axis, one of said propeller of the respective pair of propellers is provided laterally on one side of an imaginary longitudinal vertical plane of said vehicle and the other propeller of the same pair of propellers is provided symmetrically to said one propeller laterally on the other side of said medial plane.

or; The vehicle of above;
- wherein said plurality of motors are driven by pluralities of individual flows of fluid of equal rate of flow, which are separated from each other, not communicating with each other, produced individually in said fluid flow producing means and transferred from said fluid flow producing means in individual and from each other separated fluid lines to said motors.

or; The vehicle of above;
- wherein said propeller with said substantially horizontal axis is driven by a fluid motor which is communicated by at least one fluid line to a source of fluid power; and;
- wherein the flow(s) of fluid to said motor(s) with said vertical axis(axes) are operable with a rate of power variable to the rate of power which is transferred to said motor with said horizontal axis(axes).

The vehicle, for example of FIGS. 18 to 19, 40, 24 to 26 or 34 to 37, when they apply for their propellers with substantial vertical axes the motor with releasing coupling means for free-wheeling of the propeller to disengage the propeller from being driven by the respective motor, as, for example, the motors of FIGS. 7, or 9 to 11; may be defined and described in short, as follows:

A vehicle capable of travelling in air, comprising a body structure with a power plant therein to operate at least one fluid flow producing means for the supply of at least one flow of fluid under pressure, at least one propeller with a substantially horizontal axis and at least one fluid motor with a substantially vertical axis and with a fluid line to said fluid flow producing means to transfer said fluid from said fluid flow producing means to and through said motor;
- wherein said fluid motor is provided with an independently rotatable shaft and a one-way coupling means between the rotor of said motor and said shaft to release said shaft from said rotor, when said shaft rotates faster than said rotor;
- wherein said rotor drives said shaft, when pressure fluid flows through the rotor of said motor to provide a torque at least as high as the resistance of said shaft against rotation, whereby said one-way clutch means is set to engage said shaft by said rotor;
- wherein said shaft is set to a propeller to drive said propeller when said rotor drives said shaft with the axis of said at least one propeller driven by said at least one motor with said substantially vertical axis being substantially vertically directed,
- wherein a drive means is provided to drive said propeller with said substantially horizontal axis; and
- wherein said one-way clutch means releases said shaft and said propeller from said rotor of said motor when said propeller with said substantially horizontal axis drives said vehicle substantially horizontally with such a high forward speed, that said propeller with said substantially vertical axis carries said vehicle like a gyrocopter by said propeller with said vertical axis gaining a high rotary speed by the air through which it revolves and carries said vehicle.

In FIGS. 18, 19, or 24, the power plant 90 may drive the pump of FIGS. 38, 39. Ports 991, 992 may deliver high pressure fluid through respective fluid lines to the main propeller driving motor(s) 87, 88 while ports 989, 990 may be communicated to fluid line(s) 93, 94 to drive the tale motor(s) 87, 88 for revolving the tail propeller(s) 83, 84. For driving the craft with high speed forwards, the piston stroke guide ring 998 of the pump of FIGS. 38 ,39 may be set by the pilot's control over the control piston 943 gradually with increasing flight speed into the neutral position for a piston stroke='-'zero". All power of the power plant 90 goes then from high pressure fluid exit ports 989, 990 to the tail rotor motor(s) 87, 88 to revolve the tail propeller(s) 83, 84 with the full power and speed, while the main propeller(s) 82, run then in gyrocopter rotation without consumption of power through fluid flows from the power plant. The body 81 may be provided with a holding means 3301 and/or a bearing face 3303 for holding of a wing 3300 or other means. The possibilities of providing and using the means 3301 to 3303 will be shown more in detail in FIGS. 25, 26 and 34 to 37.

FIGS. 25, 26 and 34 to 37 illustrate portions of FIGS. 18, 19, 24 and additional members which are specifically beneficially applyable to FIG. 19 or others.

The body 81, 380 of the respective air borne craft is provided with the holding means 3301, which in these Figures may be a bore in the holding body 3307 which is fastened to, or is, a portion of the main body 81, 380. Referring first to FIG. 18, the fluid line connections as they may be done, by way of example, are illustrated. Power plant 90, 2380 drives the pumps 939, 940 of FIGS. 38, 39. The fluid exit ports 991, 992 are communicated to fluid line 3304 which leads the combined output fluids to the main motor 83 to revolve its rotor and the thereby the main propeller. The fluid exit ports 989 and 990 are set to fluid line 3305 to lead the output flows to fluid line 390 and thereby to the tail rotor motor(s) 87, 88 to revolve the tail propeller(s) 83, 84. The return fluid lines are not shown because they are known from the earlier descriptions and lead the return fluid from the respective motors at least indirectly back to the entrance ports of the pumps 939, 940. Referring now to all FIGS. 18, 19, 24, 34 to 37 again, the holding means has a holding body 3307, in these Figures with a bore 3301. A bar 3308 is now pivotably inserted into the bore 3301 and wings 3300 with wing portions 3300-A and 3300-B are fastened to the bars 3308 whereby the bars 3308 may form the main spars of wing 3300. Wing portion 3300-A extends to the left and portion 3300-B extends from the body 380 to the right side of the air borne craft. The mentioned wing portions are fixed or fastened to the bar or spar 3308. The wing 3300 is provided with a stopper body 3309. Thereby the following feature is obtained for the mentioned craft, if these arrangements are applied to respective craft of the mentioned Figures.

First, at start of the vertical take off craft, the main power of the power plant is transferred to the main propeller. After the craft has obtained a suitable hight in the air to start the forward flight, the tail propeller gradually turns with increasing speed.

The craft is now driven forward, the main propeller may overrun driving means and revolve as propeller of a gyrocopter, driven by the forward speed of the craft through the air, At the vertical take off proceedure the wing 3380 was blown by the upwards wind from the main propeller into the vertical position of its chord 3311 as shown in FIGS. 34 and 35. When the craft increases the forward speed the air which blows over the wing, gradually inclines the wing from the vertical position of FIGS. 34 and 35 into the forward flight position of FIGS. 36 and 37. At high speed forward flight the wing 3300 obtains the position as shown in FIGS. 36 and 37, whereby it is kept in this angular positiion with angle 3310 of the chord relative to the ground by the bearing of the stopper body 3309 on the bearing face 3303. The main propeller(s) can now become arrested and the craft can now fly forward exclusively on the wing 3380 if so desired, driven thereby forward at this time by the tail propeller(s).

The craft can thereafter (and as an aircraft or as a glider on a runway of an airport or it can land vertically by reversing the proceedures, namely disarresting the main propeller whereby it starts to revolve as a gyrocopter propeller.

Then the fluid of fluid line 3304 will after the piston stroke guide ring 998 is set by the pilot's control action into the position of maximum of piston strokes, the main motor(s) take(s) over the driving of the main propeller(s).

The arresting of lift propellers can be done by the arresters of FIGS. 1 and 1A.

It is seen from the Figures, that this arrangement can be applied to all of the mentioned Figures, whereby it obtains a specifically economic vertical take off and landing aircraft, if applied to the craft of FIG. 19. It may be noted that the craft of the mentioned Figures can be modified to the arrangements of FIGS. 25, 26, 34 to 37, after the craft have already been in use without them, simply by mounting the holding arrangement 3301–3307 onto their main bodies 380.

The details of the invention are partially also described in the claims, whereby the claims are considered to be a portion of the description of the preferred embodiments and of the summary of the invention.

What is claimed is:

1. A vehicle capable of travel in air, comprising, in combination, a body, at least one main propeller for the provision of vertical lift, at least one tail propeller for the provision of a forwardly directed thrust, a power plant and a transmission, wherein said transmission includes transfer means for the transfer of power from said power plant to said propellers to drive said propellers at least indirectly for rotary movement, wherein said transfer means include rate of power varying control means for the division of the entirety of the power which is supplied by said power plant into individual variable fractions of said entirety of power with each of said fractions defining a separate rate of power, wherein said at least one tail propeller is directed to drive said vehicle foreward, wherein said rate of power control means subjects said at least one main propeller to said entirety of power for vertical lift and landing, while it subjects said at least one tail propeller to said entirety of power at times of high speed foreward drive when it reduces the rate of power to said at least one main propeller to zero whith said rate of power control means provided with rate of power variation means which are steplessly variable to vary said individual rates of power to said propellers, and thereby the ratio of power between said rates of power, selectively, and;

wherein said transmission is a hydrostatic transmission including a variable pump with at leat one variable fluid flow outlet and at least a second fluid flow outlet, fluid lines from said outlets individually to individual flow motors which have rotors which are provided with revolvable shafts which carry said propellers, respectively, while said variable outlet controls by its variability the rotary velocity of one of said propellers relatively to the other of said propellers.

* * * * *